United States Patent
Luna et al.

(10) Patent No.: US 12,131,465 B2
(45) Date of Patent: Oct. 29, 2024

(54) USER-ASSISTED ITERATION OF CELL IMAGE SEGMENTATION

(71) Applicant: Leica Biosystems Imaging, Inc., Vista, CA (US)

(72) Inventors: Carlos Luna, Wetzlar (DE); Caitriona Lyons, Wetzlar (DE)

(73) Assignee: Leica Biosystems Imaging, Inc., Vista, CA (US)

( * ) Notice: Subject to any disclaimer, the term of this patent is extended or adjusted under 35 U.S.C. 154(b) by 310 days.

(21) Appl. No.: 17/634,212

(22) PCT Filed: Sep. 2, 2020

(86) PCT No.: PCT/US2020/049085
§ 371 (c)(1),
(2) Date: Feb. 9, 2022

(87) PCT Pub. No.: WO2021/046142
PCT Pub. Date: Mar. 11, 2021

(65) Prior Publication Data
US 2022/0277440 A1    Sep. 1, 2022

(30) Foreign Application Priority Data
Sep. 5, 2019   (EP) .................................... 19195666

(51) Int. Cl.
*G06T 7/00* (2017.01)
*G06T 7/11* (2017.01)

(52) U.S. Cl.
CPC ............. *G06T 7/0012* (2013.01); *G06T 7/11* (2017.01); *G06T 2207/20101* (2013.01); *G06T 2207/30024* (2013.01)

(58) Field of Classification Search
CPC ................... G06T 7/0012; G06T 7/11; G06T 2207/20101; G06T 2207/30024
See application file for complete search history.

(56) References Cited

U.S. PATENT DOCUMENTS

2013/0329973 A1* 12/2013 Cao ...................... G06T 7/0016
382/128

OTHER PUBLICATIONS

Perkinelmer, Inc, "inForm User Manual", "inForm User Manual Rev A, Advanced Image Analysis Software", Jul. 9, 2018, pp. 1-149, (PerkinElmer).*

(Continued)

*Primary Examiner* — Myron Wyche
(74) *Attorney, Agent, or Firm* — FROST BROWN TODD LLP

(57) ABSTRACT

A segmentation of cell image data obtains cell segmentation data for the nuclei, cytoplasm and cell membranes, which are displayed on an image pane. A data pane is also displayed which contains a table with rows specific to cells and columns specific to cell attributes. In an editing session, a user can select cells for deletion either from the data pane or the image pane. Responsive to a selection via the data pane, the image pane is updated and responsive to a selection via the image pane, the data pane is updated. At any time, the user can command a re-segmentation taking account of the edits, which starts from a version of the previous nuclear segmentation data which has been edited to remove data relating to cells selected for deletion and then from that determines the cytoplasm and cell membrane segmentation data.

20 Claims, 16 Drawing Sheets

(56) References Cited

OTHER PUBLICATIONS

Aperio GT 450, screenshot of Google image search results, accessed on Jan. 17, 2019.
Leica Biosystems: "Leica Aperio GT 450 RUO", uploaded Jul. 30, 2019, retrieved from the internet <https://vimeo.com/350887835>, accessed Sep. 8, 2022.

* cited by examiner

FIG. 1A
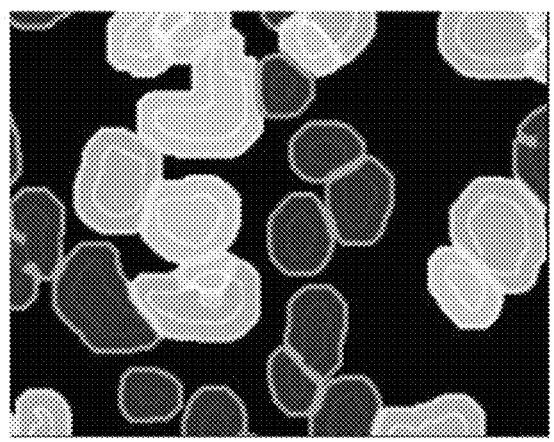
FIG. 1B
FIG. 2
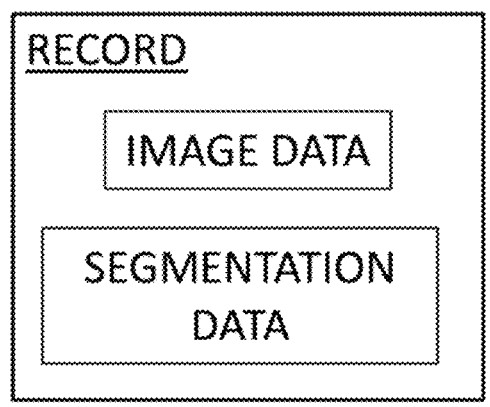

USER-ASSISTED ITERATION OF CELL IMAGE SEGMENTATION

CROSS-REFERENCE TO RELATED APPLICATIONS

The present application claims priority to European Patent App. No. 19195666.3, filed Sep. 5, 2019, entitled "USER-ASSISTED ITERATION OF CELL IMAGE SEGMENTATION" and is national stage filing of International Patent App. No. PCT/US2020/049085, filed Sep. 2, 2020, entitled "USER-ASSISTED ITERATION OF CELL IMAGE SEGMENTATION," each of which is hereby incorporated herein by reference as if set forth in full. In addition, the present application is related to the following application, which is hereby incorporated herein by reference as if set forth in full, European Patent App. No. 21196113.9, filed Sep. 10, 2021, entitled "USER-ASSISTED ITERATION OF CELL IMAGE SEGMENTATION."

FIELD

The present disclosure relates to methods and apparatus for segmenting cell images, in particular for correcting errors in an automated segmentation.

BACKGROUND

Tissue imaging to identify cells and their features is an important application of microscopy. A pathology image is an image representing tissue. Using conventional visible light microscopy, a two-dimensional (2D) image can be obtained from a single tissue section mounted on a slide. It is also possible to generate a 2D image from compositing, i.e. combining, multiple adjacent tissue sections, where each section has been differently stained or fluorescently marked in order to highlight different cell types and/or cell features. A three-dimensional (3D) image may be generated from multiple adjacent tissue sections obtained with conventional visible light microscopy. A 3D image may also be generated by obtaining a succession of vertically offset images with a small depth of focus, in a so-called z-stack, where the 2D images of the z-stack provide a 3D image analogous to the slices obtained in X-ray computer tomography (CT). Other, intrinsically 3D modalities such as holographic microscopy may be used to obtain 3D data sets, for example the technique described in US2013/057869A1. A 3D data set allows 3D images to be segmented in 3D (and displayed to the user rendered into 2D). A 3D data set also allows 2D images to be determined by compositing through a slice of the 3D data set, wherein the 2D image could then be segmented.

Cell stains are typically selective of a particular tissue feature of interest, such as cell cytoplasm or cell nuclei or cell membrane. An example of a cytoplasm stain is Haematoxylin and Eosin (H&E). An example of a nuclear stain is DAPI (4',6-diamidino-2-phenylindole) which stains nuclear DNA and hence identifies locations of nuclei. An example of fluorescent marking is for Fluorescent in situ Hybridization (FISH) which is a widely used cytogenetic technique based on attaching fluorescent probes to chromosomes to detect, analyse and quantify nuclear abnormalities through detecting the presence of specific sequences of deoxyribonucleic acid (DNA) or ribonucleic acid (RNA).

In this document, we use the term 'stain' generically to included classic contrast stains as well as fluorescent markers or other markers, such as radioactive markers. It will be understood in the art that other terms are often used for the markers, such as dyes or probes, all these terms being embraced generically in this document with the term 'stain'.

Specialist software applications are used for processing and visualising cell images. These software applications include segmentation algorithms, for 2D or 3D image data sets, which automatically identify objects of interest. Typical objects of interest are cell nuclei or whole cells, where the extent of cells may be identified by cell cytoplasm ('fill') or plasma membranes ('outline'/'boundary'). In 2D, the segmentation will identify 2D cell features, such as whole cells or cell nuclei, by their areas and/or boundary lines, such as the area occupied by the cytoplasm and lines representing the boundary line of a nucleus or cell membrane. Segmentation algorithms for 2D may be area-based, e.g. dilation from a seed (so-called blob analysis), or line-based, e.g. contour tracking, or a combination of both. In 3D, the segmentation will identify 3D cell features, such as cells or cell nuclei, by their volumes and/or boundary surfaces, such as the volume occupied by the cytoplasm and surfaces representing the boundary of a nucleus or cell. Segmentation algorithms for 3D may be volume-based, surface-based, or a combination of both.

The objects identified by a segmentation may be displayed to the user in a visualisation by outlining them and/or shading different types of object in different colours, for example. Such software applications may also include manual drawing tools which allow the user to use a pencil or other tool to draw on the image (e.g. using a graphics tablet with stylus), for example to add annotations.

A typical workflow in the art for a processing and visualising software application is as follows. A user runs the software application and issues a command to load a record of interest from an image database. The record contains one or more tissue image data sets. The user configures the software application, via a graphical user interface, to display the image data as desired. The image data for display is selected from the image data contained in the record. For example, the user may select two of a larger number of differently stained images to be composited for display, e.g. a stain and counterstain pair of images. The compositing is sometimes referred to as fusing. The user then configures settings for performing segmentation on the selected image data. The configuration settings may include pre-set combinations for different diagnostic purposes. The user then commands the software application to apply a segmentation algorithm to the image data according to the user-configured segmentation settings. The software application then displays the selected image data together with the segmentation data, with the segmentation data being overlaid on the image data. For example, outlines of cell features, e.g. nuclear outlines and cell outlines may be displayed to the user overlaid on the image data.

FIG. 1A shows an area portion of a tissue image formed by fusing together probe channel images from different probes or stains, each marked with an artificial colour for display purposes. As can be inferred from FIG. 1A, the cell features are not particularly clear. FIG. 1B shows a corresponding mark-up overlay image generated from the segmentation data obtained by analysing the image data shown in FIG. 1A in which nuclei and cell membranes are marked with lines, the cytoplasm occupying the regions between the nuclear outer surfaces and the membrane inner surfaces.

FIG. 2 shows a record storing image data and associated segmentation data.

FIGS. 3A to 3C show the three main steps of how segmentation is typically applied to identify cell features. As a first step, as shown in FIG. 3A, the nuclei are identified. The nuclear segmentation can be based on identifying pixels in 2D (or voxels in 3D) stained with a nuclear stain. As a second step, as shown in FIG. 3B, the cytoplasm is identified by growing out from the boundary of each nucleus that has been identified in the first step. The cytoplasm segmentation can be based on identifying pixels in 2D (or voxels in 3D) stained with a cytoplasmic stain. As a third step, as shown in FIG. 3C, cell membranes are identified by searching around the outer periphery of the cytoplasm region identified in the second step, either with a further segmentation, e.g. Sobel edge detection, which might be based on identifying pixels or voxels stained with a membrane stain, if one has been used, or may be more simply achieved without a segmentation based on the cytoplasm segmentation by defining the cell membranes with reference to the outer surface of the cytoplasm, e.g. an enclosed surface having a thickness of one or more pixels or voxels.

FIG. 4 is a flow diagram showing an example workflow according to a known processing and visualising software application. The cell segmentation steps described with reference to FIGS. 3A to 3C are shown collectively as Step S1, with respective sub-steps S1.1, S1.2 and S1.3 corresponding to the steps illustrated in FIGS. 3A, 3B and 3C. Once the cell segmentation has been performed, in Step S2, the software application processes the cell features to quantify different stains by calculating cell-specific attribute values from the segmentation results, where quantification may include detecting the presence of a stain within a cell feature and the amount of that stain within that cell feature, or just calculating a geometric parameter such as cell area. Then in Step S3, the output for the user is prepared, which may include preparing how the segmentation data is to be displayed overlaid on the (native) image data, determining general output parameters and determining results data on a per cell basis. In Step S4, the results are displayed in the form of a representation of the image data and overlaid segmentation data. The record is then updated, i.e. re-saved, to add the segmentation data, as well as configuration data relating to how the image was displayed in Step S4 and any other relevant data, such as user annotations.

In its generality, segmentation of tissue images is a non-trivial image processing task. Even if the image data set is perfect, errors in the segmentation may occur, for example it may be difficult to separately identify cells that are touching. In any case, the image data set will most likely not be perfect. For example, the images as acquired may contain artefacts, such as features that come from dirt in the sample or on the slide, or the images may have been acquired with focusing that varies laterally across the sample. The results of the segmentation will therefore in general be imperfect and so will need to be checked by an expert, such as a clinical expert in the case that a medical diagnosis is to be made from the image data. For example, a decision on whether a patient should undergo chemotherapy, may depend on the number of cells of a particular type, or their aggregate area, that are identified in the image, and/or by the intensity of a fluorescent stain located in regions such as those localized to the cell membranes, the cytoplasm regions or the nuclei. A user could decide to reject the entire segmentation result and then perform a new segmentation after adjusting the configuration settings with the aim of improving the quality of the result. However, if the results of the automated segmentation are predominantly acceptable, save for a few isolated errors across the image, it is desirable for the image processing and visualisation software to be provided with suitable graphical user interface (GUI) tools that support the user in correcting those segmentation errors through manual intervention.

SUMMARY

According to one aspect of the disclosure, there is provided a method of processing image data representing cells, the method comprising:

performing a segmentation of the image data to obtain cell segmentation data by finding each of a plurality of nuclei present in the image data and determining their spatial extent to obtain nuclear segmentation data and then, based on the nuclear segmentation data, determining cytoplasm segmentation data and cell membrane segmentation data;

displaying on a display an image pane comprising a selection from a tissue image of the image data and a segmentation image of the cell segmentation data, and a data pane comprising a table of rows and columns, the rows being specific to cells identified in the cell segmentation data and the columns being specific to cell attributes;

selecting cells for deletion from the segmentation data through user interaction with the display in an editing session, wherein a cell is selectable from the data pane by selecting the row for that cell in the table and from the image pane by selecting that cell in the image through its segmentation data;

responsive to a selection via the data pane correspondingly updating the image pane to show the selection, and responsive to a selection via the image pane correspondingly updating the data pane to show the selection;

performing responsive to a user command a re-segmentation taking account of the cells selected for deletion, the re-segmentation proceeding by editing the nuclear segmentation data to remove a data portion that relates to cells selected for deletion and then, based on the edited nuclear segmentation data, redetermining cytoplasm segmentation data and cell membrane segmentation data; and re-displaying on the display the image pane and the data pane based on the re-segmentation.

The editing session may further comprise receiving user input in the image pane to identify cells for addition to the segmentation data, and wherein the re-segmentation takes account of the cells identified for addition by editing the nuclear segmentation data to add a further data portion that relates to cells identified for addition. The data pane may or may not be updated responsive to identifying a cell for addition by adding a row for the cell in the table. In the latter case, the table is first updated to add the new rows upon re-display after re-segmentation.

Selecting an individual cell or group of cells for deletion (and also optionally indicating of any cells to be added) is thus a two-stage process involving first an editing session and then a re-segmentation to take account of the edits. The editing is thus provisional, and the changes made during the editing session only become anchored in the segmentation data upon re-segmentation.

In certain editing sessions, one or more cells in a particular area of the tissue image are selected for deletion and then, in the same area, one or more cells are identified for addition. The user thereby corrects parts of the initial segmentation which are deemed by the user to be flawed with an erase and re-draw procedure.

Cells can be added by drawing an enclosed area onto the image pane. This may be done by tracing around the boundary of a cell nucleus, or cell membrane, or cell cytoplasm visible in the displayed two-dimensional representation of the image. Alternatively, this may be done by marking an area localized around the cell which contains the cell, and then applying an image processing algorithm to identify segmentation data for the cell, e.g. by erosion, or by marking a point within a cell, and then applying an image processing algorithm to identify segmentation data for the cell, e.g. by dilation. A preferred approach is to trace the nucleus boundary.

For the image pane, the user can be provided with user interface controls which provide independent control of the display of each of the nuclear segmentation data, the cytoplasm segmentation data and the cell membrane segmentation data. The user is thus able to view, for example, only the nuclear segmentation data.

The image data will in most cases for digital pathology comprise a plurality of channel images, each associated with a different stain. The tissue image will then either be of only one channel, or it will be a composite of two or more of the channel images that have been fused together. To assist handling of the different channels, the user can be provided with user interface controls to enable independent control of which channel images are to be included in the tissue image. When the tissue image is a composite of multiple fused images, each associated with a different stain, a cell attribute may be specific to one particular stain, or a particular combination of stains. For example, if one stain is a fluorescent stain marking the expression of a particular protein, a cell attribute could measure the integrated intensity of that stain within each cell, or adjacent the cell membrane of each cell, so that sorting according to this cell attribute would allow all cells that only have this stain to less than a threshold value to be selected.

The editing and re-segmenting may be performed iteratively any number of times. Namely, subsequent to a re-segmentation and re-display, a further editing session can be performed followed by a further re-segmentation and re-display.

It may be computationally more efficient if the re-segmentation is limited to a particular area of the tissue image where the cells affected by the editing session are located. The re-segmentation can thus be locally confined to regions proximal to where the segmentation data has been edited.

It is helpful for the editing session to make the table sortable by column with a user interface control, thereby to order the display of rows in the table by a value of a particular cell attribute. This sorting features facilitates selecting a group of cells with common attributes or attribute values from the data pane, e.g. cells with an integrated intensity of a particular stain above or below a threshold. Cells may be selected in the image pane either by marking the segmentation data for the whole cell, or just the cell membrane's segmentation data, or just the cell cytoplasm's segmentation data, or just the nucleus's segmentation data.

The table in the data pane may further comprise a column for a cell label. The cell label may be arbitrary. The table in the data pane may further comprise a column in which is displayed a cell thumbnail image. A cell attribute may be specific to one part of the cell, e.g. the nucleus, cytoplasm or membrane, or may relate to the whole cell, e.g. cell area. One cell attribute is an origin attribute indicating whether the cell originates from segmentation or the user editing session.

The method may further comprise saving the cell segmentation data determined by the re-segmentation. The initial segmentation and the re-segmentation may be performed in the same session, or in different sessions. In the latter case, the initial segmentation is performed in a first session which includes saving the initial set of segmentation data, and the re-segmentation is performed in a second session which includes retrieving the image data and the initial set of segmentation data.

The image data may represent a two-dimensional representation of cells or a three-dimensional representation of cells. In some embodiments, the image data is a 2D image data set, such as derived from conventional microscopy of a tissue section mounted on a slide, so that the image data constitutes a two-dimensional representation of cells. In other embodiments, the image data is a 3D image data set, such as derived from holographic microscopy or a z-stack of 2D images, so that the image data constitutes a three-dimensional representation of cells.

According to another aspect of the disclosure, there is provided a computer program product bearing machine readable instructions which when loaded and executed on a computer apparatus cause the computer apparatus to perform the above methods.

A computer apparatus loaded with machine readable instructions may also be provided.

A still further aspect relates to a clinical network comprising:
  the above-described computer apparatus;
  a data repository configured to store records, each record comprising image data and segmentation data, wherein the image data represents cells and the segmentation data represents cell features identified in the image data; and
  network connections enabling transfer of the records or parts thereof between the computer apparatus and the data repository.

A still further aspect relates to an image acquisition apparatus for acquiring in 2D or 3D image data of an image representing cells from tissue samples. The apparatus comprises:
  a microscope arrangement operable to acquire images of tissue samples; and
  a computer apparatus loaded with:
  first machine readable instructions operable to control the microscope arrangement to acquire the image data (e.g. implemented with control software); and
  second machine readable instructions operable to perform the above method (e.g. implemented with image processing and visualisation software).

BRIEF DESCRIPTION OF THE DRAWINGS

FIGS. 1A & 1B show an example tissue image and a corresponding mark-up overlay image generated from segmentation data of the tissue image.

FIG. 2 shows a record storing image data and segmentation data.

DETAILED DESCRIPTION OF THE PREFERRED EMBODIMENTS

Figure 3A:
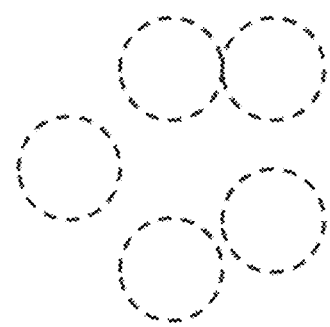
FIGS. 3A to 3C show the three main steps of how segmentation can be applied to identify cell features.

In the following detailed description, for purposes of explanation and not limitation, specific details are set forth in order to provide a better understanding of the present disclosure. It will be apparent to one skilled in the art that the present disclosure may be practiced in other embodiments that depart from these specific details.

In this document we use the term segmentation to mean subdividing an image, which may be a 2D or 3D image into linked groups of pixels or voxels in order to identify cells and/or cell features of interest. (The segmentation may also identify pixels or voxels that are not of interest, such as background.) Further detail on segmentation can be found in:

Chapter 1 of the textbook Gonzalez and Woods "Digital Image Processing" 3rd edition (2008), pp. 3 to 18, ISBN 013168728 the full contents of which are incorporated herein by reference.

Segmentation may be based on thresholding, region growing and/or edge detection. Segmentation may involve the application of morphological operators. A morphological operator is understood to mean a mathematical operator used for shape analysis, and in particular for extracting image components that are useful in the representation and description of shape and in particular for determining the extent of objects in an image, e.g. by computing the boundary of an object. For 2D or 3D pathology images, this means the shape of cells or cell elements, such as nuclei. Example morphological operators are: dilation, erosion, opening, closing. Further detail can be found in:

Chapter 9, entitled "Morphological Image Processing", of the textbook Gonzalez and Woods ibid, pp. 627 to 688, ISBN 013168728, and Chapter 14, entitled "Edge Detection in Microscope Images", of the textbook "Image Analysis in Histology" Edited by Richard Wootton, David Springall and Julia Polak (1995), pp. 241-261, ISBN 0521434823, the full contents of which are incorporated herein by reference.

Segmentation may be performed using any combination of standard image processing techniques, for example as described in the above-referenced textbook chapters. The images may be colour or grayscale. The images may be modified by applying a contrast enhancement filter. The segmentation to identify objects of interest in the image may involve any or all of the following image processing techniques:

1. Variance based analysis to identify the seed areas
2. Adaptive thresholding
3. Morphological operations
4. Contour identification
5. Contour merging based on proximity heuristic rules
6. Calculation of invariant image moments
7. Edge extraction (e.g. Sobel edge detection)
8. Curvature flow filtering
9. Superpixel clustering These image processing steps for performing segmentation are described by way of example and should not be interpreted as being in any way limitative on the scope.

Figure 5:
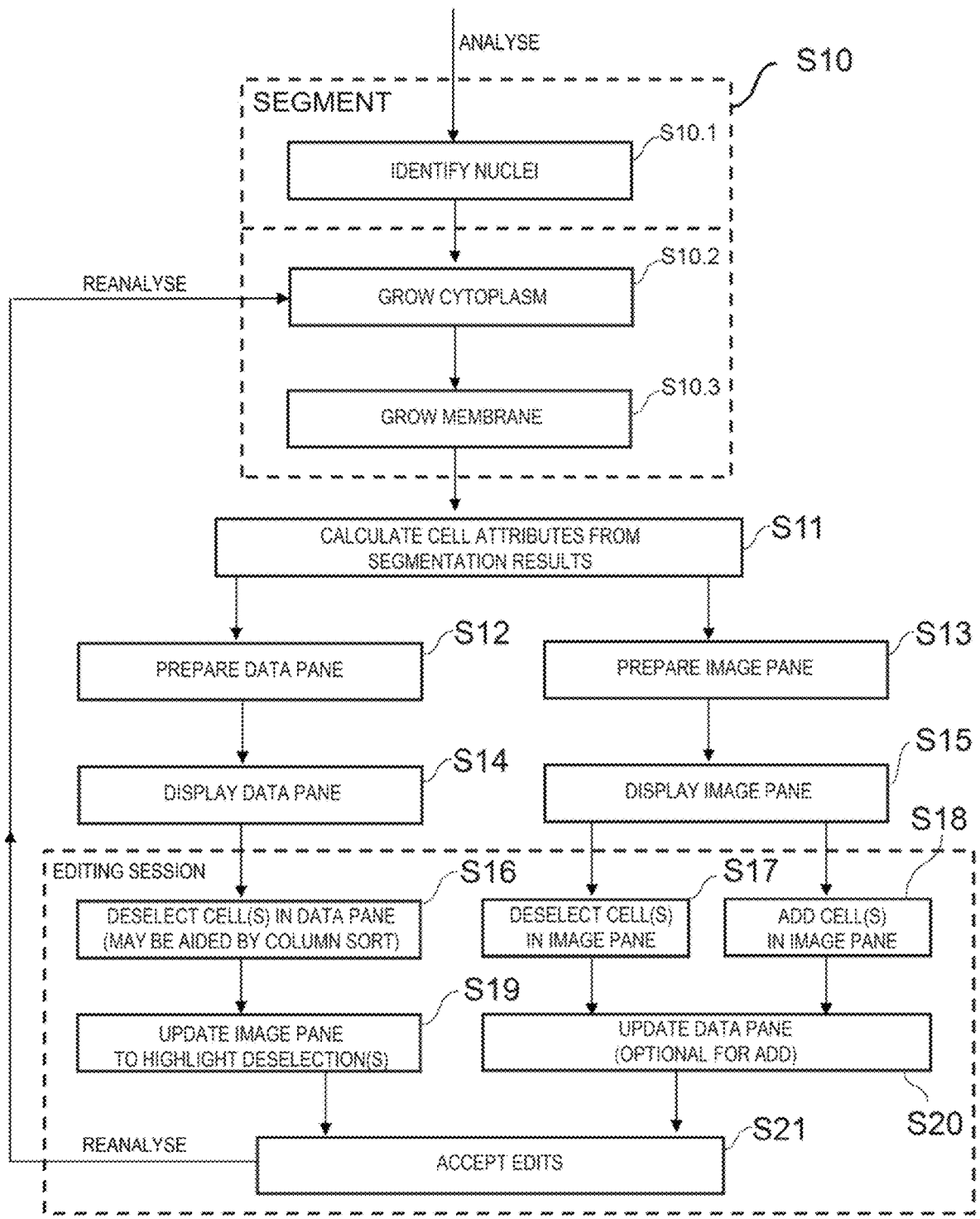
FIG. 5 is a flow diagram showing an example workflow according to a processing and visualising software application of an embodiment of the disclosure.

FIG. 5 is a flow diagram showing an example workflow according to a processing and visualising software application according to an embodiment of the disclosure.

Figure 3B:
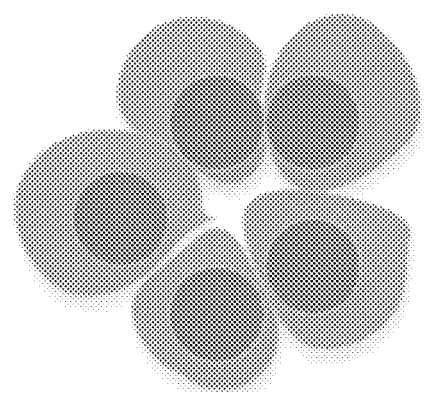
Figure 3C:
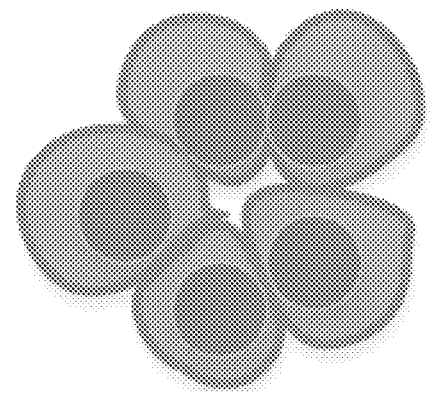
Figure 4:
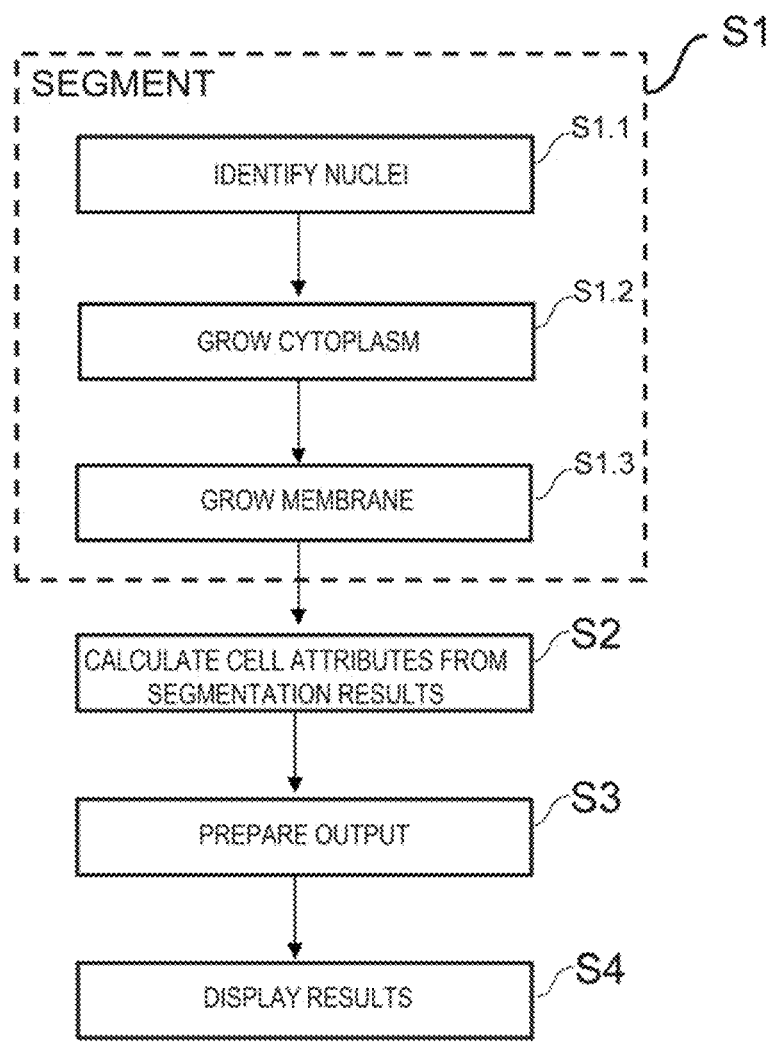
FIG. 4 is a flow diagram showing an example workflow according to a known processing and visualising software application.

The workflow starts by performing a segmentation in Step S10, which is made up of sub-step S10.1 for identifying the nuclei, sub-step S10.2 for growing cytoplasm regions and sub-step S10.3 for growing the cell membranes, these three sub-steps corresponding to the steps of FIGS. 3A, 3B and 3C. Once the cell segmentation has been performed, then in Step S11 cell-specific parameter values for various cell attributes are calculated. Some attributes will be based on the segmentation results alone, e.g. to determine topological parameters such as area, shape or maximum dimension. Other attributes will be based on applying the segmentation results to one or more channels of the tissue image to determine a property of the tissue image within the cell area e.g. if one channel represents an image of a specific fluorescent probe, then the integrated intensity of that probe's fluorescence in each cell (or part of cell) may be calculated, e.g. to measure the amount of expression of a particular protein. Another probe- or marker-specific attribute would be a binary attribute indicating whether a particular marker was present or not present in a cell or a part of a cell (e.g. its nucleus, cytoplasm or membrane). In some cases, the attribute may not be within the cell area, but may by adjacent the cell area, e.g. to quantify a marker indicating antibody secretion from the cell membranes that may be present as a halo of finite thickness in a region outside the cell membranes.

The output for the user is prepared which includes preparation of a data pane (e.g., a table) in Step S12 and an image pane (e.g., a two-dimensional representation or a three-dimensional representation) in Step S13.

The image pane presents an image of the tissue area comprising one or more of the following three components: a tissue image, a mark-up overlay image and a cell boundary overlay image.

The tissue image and mark-up overlay images are intended as alternative presentations which the user will toggle between for comparison. The tissue image and the cell boundary overlay image are intended for co-presentation in a fused image.

The mark-up overlay image is a visualisation layer to present the results of the segmentation for all cell parts, i.e. nucleus, cytoplasm and membrane, and typically uses vivid colours and cartoonish design approaches so that cells and their main parts are highlighted. The mark-up overlay image may also use different colours for cells that have been determined by the segmentation to be of different types, e.g. tumour and non-tumour.

The cell boundary overlay image is another visualisation layer to present the results of the segmentation, but only as simple boundaries drawn as lines. The cell boundary overlay image may consist only of nuclear outlines, only of cell membrane outlines, or both.

The tissue image is of images obtained from the microscope (typically a scanner). The tissue image is typically a fusion of a plurality of probe channels, i.e. an overlay or other combination of several component images, each specific to a particular stain including sometimes also an unstained image. These may be images from adjacent slices of tissue which have been differently stained. The user is free to select which of these component images are included in the fusion by selecting and deselecting each component image, such as DAPI, Spectrum Green, Spectrum Orange. The tissue image is thus a two-dimensional representation of the image data, either in its entirety or with selected channel combinations thereof In the image pane, the user is free to select which of the tissue image, the mark-up overlay image and the cell boundary overlay image are displayed in the image pane. One common presentation by a user is to toggle rapidly between the tissue image and the mark-up overlay image to compare the two images and thus judge the quality of the segmentation. Another common presentation by a user is to select an overlay of a cell boundary overlay image (for example of nuclear boundaries) and a tissue image which takes only a channel that relates to a corresponding stain (in this example a nuclear stain), from which the user can see how reliably the segmentation has identified a particular cell component (in this example the nuclei).

In the data pane, the segmentation results are presented as a table comprising rows and columns. Each row is specific to a cell that has been identified as a cell in the segmentation data. Each column provides cell-specific values of a particular cell attribute, such as area or integrated intensity of a particular stain. The left-most column may conveniently be a cell label (or name), which may be arbitrary, e.g. a number allocated by the segmentation algorithm based on position in the tissue image. A column displaying a thumbnail image of the cell in the tissue image may also be included.

As well as cell-specific attributes some generic output parameters are determined, such as the total number of nuclei detected, the area of the detected nuclei, the average concentration of relevant stains/dyes in the detected nuclei, the percentage area of relevant stains/dyes in each relevant compartment (compartments are e.g. nucleus, cytoplasm, cell membrane).

The data pane and image pane are displayed together for the user on a display in steps S14 and S15 respectively.

In an editing session based on Steps S16 to S21, the user is then able to manually intervene using GUI tools (e.g., a first cell feature removal tool for marking one or more cells for removal in the table. a second cell feature removal tool for marking one or more cells for removal in the representation, and/or a cell feature adding tool for marking one or more cells for addition in the table and/or the representation) that support correction of errors in the segmentation via the data pane and the image pane. Namely, the user has the option of editing the segmentation via the data pane or the image pane as desired as shown with Steps S16, S17 and S18.

Step S16 involves the user manually intervening with an image-based cell feature removal tool that allows the user to select for deletion from the data pane a portion of the initial set of segmentation data by marking one or more cells in the table.

Step S17 involves the user manually intervening with a data-based cell feature removal tool that allows the user to select for deletion from the image pane a portion of the initial set of segmentation data by marking the two-dimensional representation of the image on the display.

Step S18 involves the user manually intervening with a cell feature adding tool that allows the user to add new segmentation data to the initial set of segmentation data by marking the two-dimensional representation of the image on the display. Examples of how this pair of GUI tools may be implemented are described further below. User input in the image pane, such as drawing the outline of a cell or cell nucleus identifies a cell for addition to the segmentation data. The data pane may or may not be updated responsive to identifying a cell for addition. The optional update to the data pane at this stage is to add a row for the new cell in the table, although at this stage only a very few attribute values for the added cell would be known, since most attribute values will first be computed upon re-segmentation. If the data pane is not update in Step S20 in the case of an addition in Step S18, then an update of the table to add a row for the new cell would take place as a result of the next re-segmentation, i.e. at the next traverse of Steps S11 and S12.

In Step S19, responsive to a cell selection via the data pane in Step S16, the image pane is updated to show the cell selection.

In Step S20, responsive to a cell selection for deletion via the image pane in Step S17 (or optionally a cell addition via the image pane in Step S18), the data pane is updated to show the selection (or addition).

One common and useful mode of use during an editing session is for the user to correct errors in the segmentation data by removing incorrect segmentation data in Steps S16 or S17 and adding correct segmentation data in Step S18, where by 'correct' and 'incorrect' we mean as decided subjectively by the user with reference to the representation of the image data displayed to the user.

In Step S21, the editing session concludes with receipt of a user command accepting the current state of the edits. The process flow then loops back to perform a re-segmentation taking account of the edits, i.e. taking account of the fact that some cells may have been selected for deletion and other cells (or more precisely segmentation data for other cells) may have been identified for addition. When a user triggers a reanalysis by accepting the current state of edits in the editing session, the process flow returns to Sub-step S10.2 (not Sub-step S10.1). That is the re-segmentation does not involve an ab initio re-segmenting of the nuclei from the image data, but rather takes as the nuclear segmentation data a modified set made up of the nuclear segmentation data from the initial segmentation (or previous segmentation in the case that the feedback loop has already been traversed at least once) less the nuclear segmentation data relating to what has been selected for deletion by the user using the cell feature removal tool plus the nuclear segmentation data relating to what has been added by the user using the cell feature adding tool. After looping back to Sub-step S10.2, a cytoplasm region is (re-)grown from each nucleus as defined by the modified set of nuclear segmentation data to determine cell cytoplasm segmentation data. The cytoplasm regrowth may be performed using a morphological operator, such as a dilation operator. The flow then proceeds to Sub-step S10.3 to identify a cell membrane for each cell based on the cell cytoplasm segmentation data, thereby to (re-)determine the cell membrane segmentation data. Next, the cell attributes and other generic parameters are re-calculated and the results of the re-segmentation are displayed in the image pane and the data pane. The user can then review the results and decide whether to embark upon a fresh editing session and a subsequent further re-segmentation.

Further GUI controls may be provided, such as an 'undo' command to revert to the segmentation data as it existed prior to the most recent user edits and/or re-segmentation. Another GUI control may be provided to delete all existing segmentation data, so that a fresh new segmentation may then be performed, perhaps using different configuration settings.

At an appropriate point in the process flow, and at the latest when ending a session, the record is updated, i.e. re-saved, to add the segmentation data in its current form, as well as configuration data relating to how the image was displayed in the image pane and data pane, and any other relevant data, such as user annotations.

FIG. 5 implies that the steps are all performed in a single session, but this need not be the case. An alternative is where the automated segmentation is carried out on the image data at an earlier stage, e.g. immediately after acquiring the image data, and then saved as a record to a data repository such as a slide database. The image data with the segmentation data from the automated segmentation can then be loaded at the start of a subsequent session having the purpose of allowing a user to review and, if necessary, correct or re-do the original automated segmentation. In terms of varying the workflow shown in FIG. 5, this means adding an intermediate saving step after Step S10, and then the later editing session would start by retrieving the saved image data and segmentation data from the record and entering the workflow of FIG. 5 at Step S11. In this way, the initial segmentation and the re-segmentation are performed in different user sessions, the initial segmentation being performed in a first user session which includes saving the image data and the initial set of segmentation data, and the re-segmentation being performed in a second session which includes retrieving the image data and the initial set of segmentation data.

Figure 6:
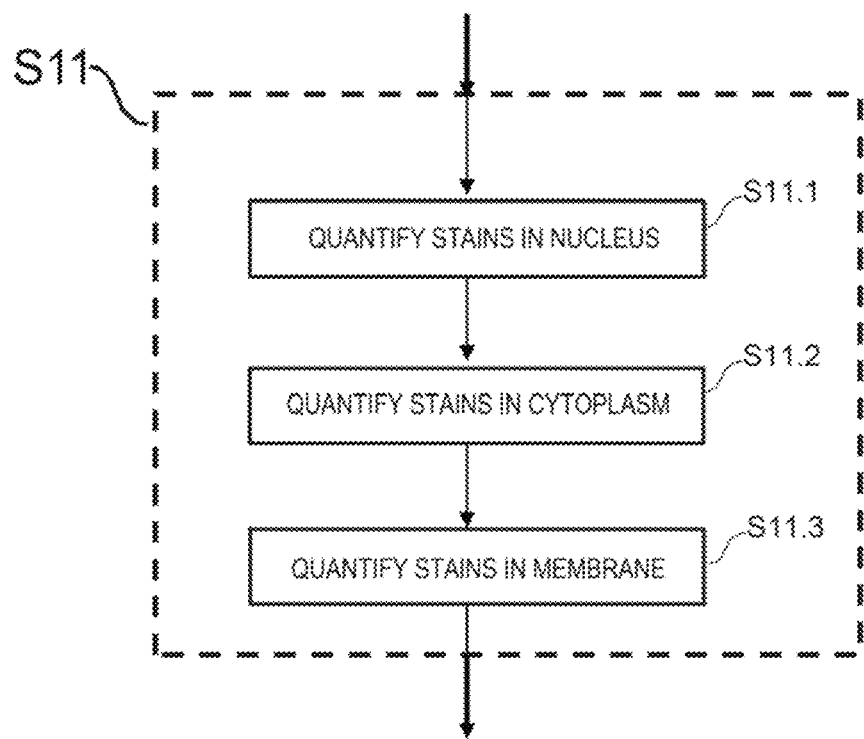
FIG. 6 is a flow diagram showing sub-steps of one part of the workflow of FIG. 5.

FIG. 6 is a flow diagram showing sub-steps of one part of the workflow of FIG. 5. In Sub-steps S11.1, S11.2 and S11.3, the stains are separately quantified for each of the nuclei, cytoplasm and membranes. It will be understood that which of these three sub-steps are carried out will be application specific, so any combination of one or more of these options are possible. For example, which of these sub-steps are relevant will depend on how the sample has been stained, i.e. what stains have been used and for which cell features, and the diagnostic purpose.

FIGS. 7A to 7D show schematically selected steps of a workflow for performing re-segmentation assisted by user intervention with an image-based cell feature removal tool according to Step S17 of FIG. 5.

Figure 7A:
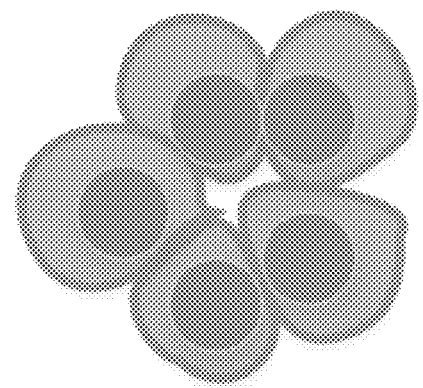
FIGS. 7A to 7D show selected steps of a workflow for performing a partial re-segmentation after user intervention with a cell feature removal tool according to one traverse through the process flow of FIG. 5.

FIG. 7A shows schematically a group of cells as displayed with overlaid segmentation data from an initial, fully automated segmentation.

Figure 7B:
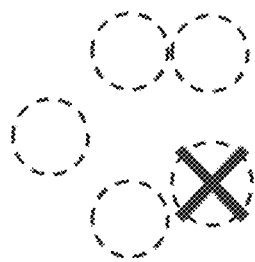

FIG. 7B shows schematically how a user can manually intervene by using the cell feature removal tool to select for deletion one of the cells, which, according to the user's assessment of the image data, is not actually a cell in the image, but rather the automated segmentation has incorrectly deemed a cell to exist when there is not one. The cell feature selected for deletion is schematically shown with the cross symbol. In a real system, editing takes place with a display pane which shows the tissue image, e.g. nuclei only by selecting a nuclear stain channel image, in combination with an overlaid cell boundary overlay image, e.g. only the nuclear boundaries, and the act of selecting a cell for deletion can be visually indicated by no longer displaying the cell boundary of that cell, e.g. by no longer displaying the nucleus outline of that cell. Other display options include greying out or blurring cells or cell features which have been selected for deletion with the GUI tool.

Figure 7C:
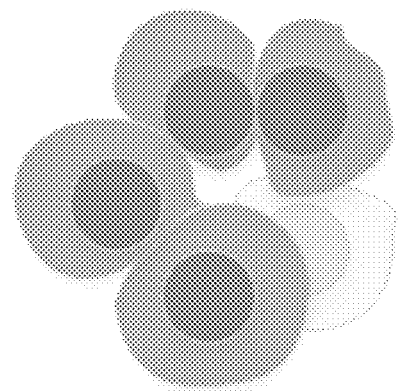

FIG. 7C shows schematically an intermediate result of the re-segmentation, where the re-segmentation initiated by taking the nuclei from FIG. 7B, i.e. the originally found nuclei less the one that the user deselected. The intermediate result shown in FIG. 7C is that obtained after growing the cytoplasm regions. For explanation, the cell that was in the original segmentation, but is not present in the re-segmentation is shown faint (i.e. greyed out), but this would not normally be present in a display of an actual system. The cytoplasm regions are grown from their respective nuclei concurrently so as to mediate between competing space. That is if two (or more) adjacent nuclei are closer to each other than the normal cell size would ordinarily permit, then some form of mediation or negotiation is incorporated in the cytoplasmic segmentation computations to arrive at an accurate overall result. The mediation may take account of recognition of cytoplasm pixels (or voxels) while growing or otherwise determining the cytoplasm.

Figure 7D:
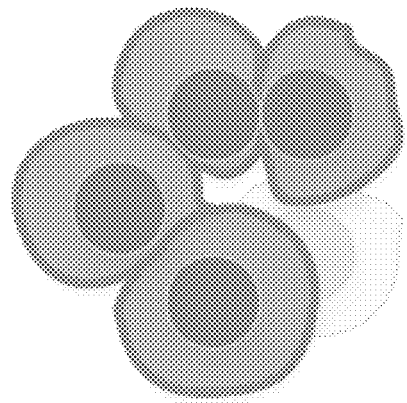

FIG. 7D shows schematically the final result of the re-segmentation after determining the cell membranes based on the intermediate result of FIG. 7C, again showing faintly the cell that is not present in the re-segmentation.

FIGS. 8A to 8D show selected steps of a workflow for performing re-segmentation assisted by user intervention with a cell feature adding tool according to Step S18 of FIG. 5.

Figure 8A:
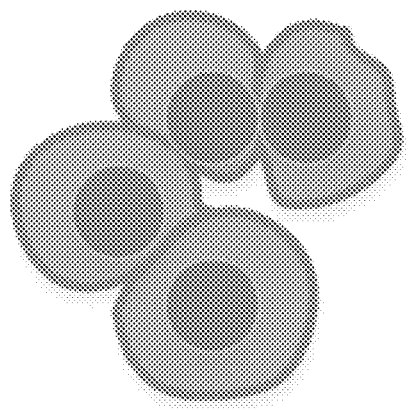
FIGS. 8A to 8D show selected steps of a workflow for performing a partial re-segmentation after user intervention with a cell feature adding tool according to another traverse of the process flow of FIG. 5.

FIG. 8A shows schematically a group of cells as displayed with overlaid segmentation data from an initial, fully automated segmentation.

Figure 8B:
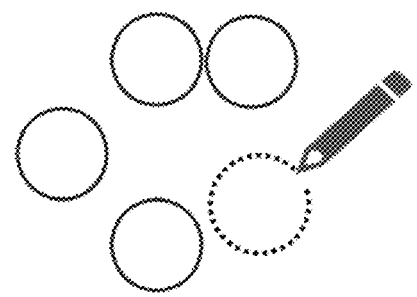

FIG. 8B shows schematically how a user can manually intervene by using the cell feature adding tool to add a cell feature, which, according to the user's assessment of the image data is present but is not currently included in the segmentation data. The added cell feature is shown as a nucleus. The user marks a new nucleus on the display with the cell feature adding tool, as indicated by drawing an outline around the perimeter of a nucleus that the user can see in the image data with a pencil tool. As an alternative to a pencil tool any other marking tool can be used that is capable of providing this function. As an alternative to line drawing, an object of interest may be defined by shading a region on the display, i.e. using a shading tool. Another alternative is to mark objects with a geometric shape selection and sizing tool. For example, if the cell features, such as the nuclei, are not generally circular, then another geometric shape may be used as appropriate. For example, the geometric shape may be selected from one of: a circle, a circle truncated with a chord, an oval or ellipse, a square, or a rectangle.

Figure 8C:
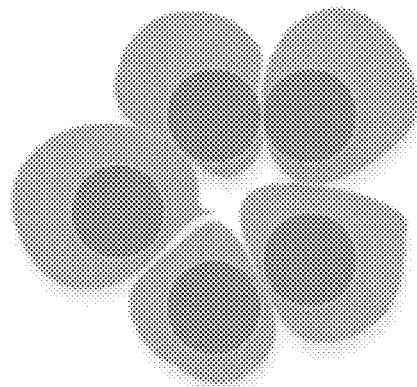

FIG. 8C shows schematically an intermediate result of the re-segmentation, where the re-segmentation is initiated from nuclear segmentation data relating to the nuclei from FIG. 8B, i.e. the originally found nuclei, plus the one that the user added. The intermediate result shown in FIG. 8C is after growing the cytoplasm regions. The cytoplasm regions are grown from their respective nuclei concurrently so as to mediate between competing space, as described further above with reference to FIG. 7C.

Figure 8D:
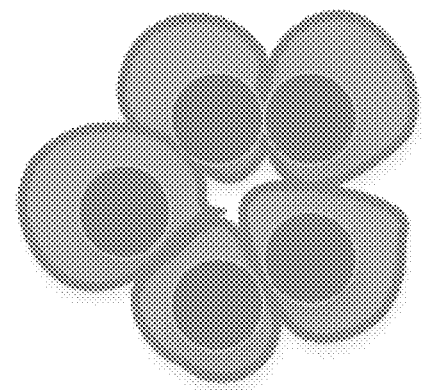

FIG. 8D shows schematically the final result of the re-segmentation after determining the cell membranes based on the intermediate result of FIG. 8C.

Considering both removal and adding of cells as shown in FIGS. 7A to 7D and FIGS. 8A to 8D respectively, it will be understood that using both these GUI tools in combination provides a powerful functionality to the user, since the user can first use the cell feature removal tool to select for deletion cell features from localized areas within the automated segmentation that contain errors, and then use the cell feature adding tool to take corrective action in these localized areas, in particular by adding back correct nuclear segmentation data that is then used as a seed by the partial re-segmentation of the cytoplasm regions and cell membranes. That is, at least some of the new segmentation data added by the cell feature adding tool relates to an area of the two-dimensional representation of the image coinciding with segmentation data selected for deletion by the cell feature removal tool.

In summary, the cell feature adding tool is used by the user to mark on the two-dimensional representation of the image as displayed cell features that the user can see from the image data in the two-dimensional representation of the image, but which are not identified by the displayed segmentation data, either because the initial set of segmentation data did not identify the cell feature in question, or because the user decided that the initial set of segmentation data had mis-segmented the area in question and so the user had removed that portion of the segmentation data from the display by selecting it for deletion with the cell feature removal tool. For example, a commonly needed correction would be when the initial segmentation identifies two cells as one, or one cell as two. In those two example cases, the user would select for deletion the segmentation data related to that area in the displayed image with the cell feature removal tool, and then redraw a correct representation with the cell feature adding tool. The redrawing could be done by the user drawing in the two nuclei or one nucleus respectively.

In the above embodiments. The image data and segmentation data may be stored in a record, as shown in FIG. 2. Moreover, the image data may be stored without segmentation data, either because no segmentation has yet been performed on the image data, or because the segmentation is always done on the fly, and not saved to the record. Moreover, the segmentation data when stored in the record may be segmentation from an initial segmentation and/or a re-segmentation as described above.

In the above embodiments, the re-segmentation can extend over the whole area or volume of image data. However, an alternative to save computing power, and hence processing time, would be to confine the re-segmentation to regions proximal to where the segmentation data has been modified by the cell feature removal tool and/or the cell feature adding tool. For example, the region around each cell selected for deletion cell may be confined to include neighbouring cells only. Neighbouring cells may be nearest neighbours only, or nearest and next nearest neighbours. Another definition of neighbouring cells may be cells that touch, or are closely proximal to, the cell selected for deletion, optionally including any further cells that touch, or are closely proximal to, the touching neighbour cell, so that for example re-segmentation would include all cells, and only those cells, that are part of a cell aggregate, such as a cell colony. Another definition of neighbouring cells may be an arbitrary, geometric definition based on a region whose size is defined by a certain multiple of the dimensions of the cell selected for deletion, e.g. 2, 3, 4, 5, 6, 7, 8, 9 or 10 times, plus/minus 0.5, the maximum lateral dimension of the cell.

In the above embodiments, the actions performed with the above-described GUI tools may be controlled through a graphical user interface comprising a display and a user input mechanism, such as a graphics tablet with stylus, touchscreen display, or a conventional display with mouse or trackball driving a cursor.

In the above embodiments, there are various options for implementing the cell feature adding tool. The simplest implementation would be to implement the cell feature adding tool such that the user is expected to mark new nuclei on the two-dimensional representation of the image on the display. The software application could then accept what the user has drawn without modification or could apply a segmentation computation to refine the user-drawn outline with reference to pixel (or voxel) properties proximal to the outline. An alternative implementation would be to implement the cell feature adding tool such that the user clicks on a point on the two-dimensional representation of the image where a nucleus is defined by the user to exist, and a segmentation computation takes the immediate proximity of the point (being a proximity much smaller than the usual nucleus size, e.g. 10× smaller) as providing a definition of pixels (or voxels) of that nucleus which is then fed into a morphological operator, such as a dilation operator, to determine the extent of the nucleus to be added. Another alternative would be to implement the cell feature adding tool such that the user draws around a larger area which is deemed to contain a nucleus which the user wishes to add and a segmentation computation looks within this larger area to identify the nucleus, e.g. through applying an erosion operator. A still further option would be to implement the cell feature adding tool such that the user is expected to draw the cell membrane and a segmentation computation grows inwards from the cell membrane, e.g. by erosion, to identify cytoplasm segmentation data, and then the cytoplasm segmentation data is used as a basis for finding the nucleus segmentation data for the nucleus to be added.

In the above detailed description it has been assumed that the segmentation data includes segmentation data for only a single type of object of interest, where, for example there could be one object type for each of a plurality of different cell types that could occur in a given kind of sample. However, it is possible that there are different subsets of segmentation data, each for a different type of feature. For example, features marked with different fluorescent markers and/or different features as distinguished topologically in the image data such as cell outlines and nucleus outlines. If this is the case, it will be understood that the above-described methods can be extended such that it is applied on a per object type basis.

Figure 9A:
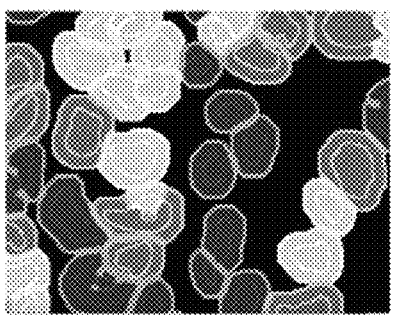
FIGS. 9A to 9I show a sequence of image panes during an example editing session in which segmentation data for a group of four neighbouring cells is removed and then substitute segmentation data for a single cell of a different shape is added.

FIGS. 9A to 9I show a sequence of image panes during an example editing session in which segmentation data for a group of four neighbouring cells is removed and then substitute segmentation data for a single cell of a different shape is added. FIGS. 10A to 10I show a sequence of data panes during the same example editing session as shown in FIGS. 9A to 9I. In other words, FIGS. 9A & 10A are a pair showing the image pane and data pane respectively in the same display of the visualisation application. The same is true of FIGS. 9B & 10B etc.

The starting point for the example is that a user has already accessed a file database, found a desired image data file to review, and loaded the file into a visualisation application. The visualisation application has displayed an image from which the user has selected a sub-area for analysis. The sub-area may in some cases be the whole slide image but will usually be a selected area portion.

FIGS. 9A & 10A show the image and data panes after the user has run an initial segmentation over the selected sub-area. The image pane shows the image with a mark-up overlay image in which three cell types have been recognized shaded in different colours. In the monochrome representation of FIG. 9A (and also FIGS. 9F, 9G, 9H and 9I), the three cell types are light grey, darker grey and very dark grey. For each cell in these figures, the nucleus outline as well as the cell membrane outline is visible. The user may rapidly toggle the image pane between this view and a view of the tissue image with a suitable GUI control. The main part of the data pane is a table. The table rows show the cells identified in the cell segmentation data. The table columns show cell attribute values. As can be seen from the column headers, as well as columns for cell attributes, there is also a column for a thumbnail image of the cells, a column for a cell name, which here is just based on a sequential integer numbering scheme, where the numbers are automatically allocated by the segmentation algorithm, and also a column showing the origin of the cell. The cell origin will in nearly all cases be the segmentation algorithm, the exception being when a cell is one that has been added by a user in an editing session. The example cell attributes shown in the example are:

presence in class strong nucleus, e.g. strongly fluorescing presence in class strong cytoplasm, e.g. strongly fluorescing presence in class unclassified cell type area of nucleus area of DAPI counterstain in nuclear compartment As can be seen from FIG. 10A, the data pane also shows some generic data for the analysis, such as the total number of nuclei found by the segmentation, the total nuclear area and the average area per nucleus.

Figure 9B:
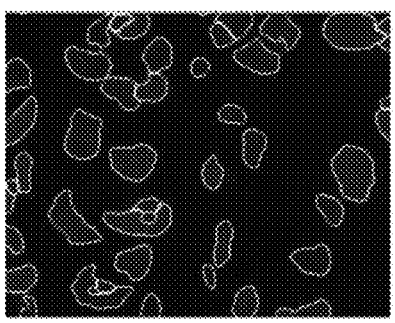
Figure 10A:
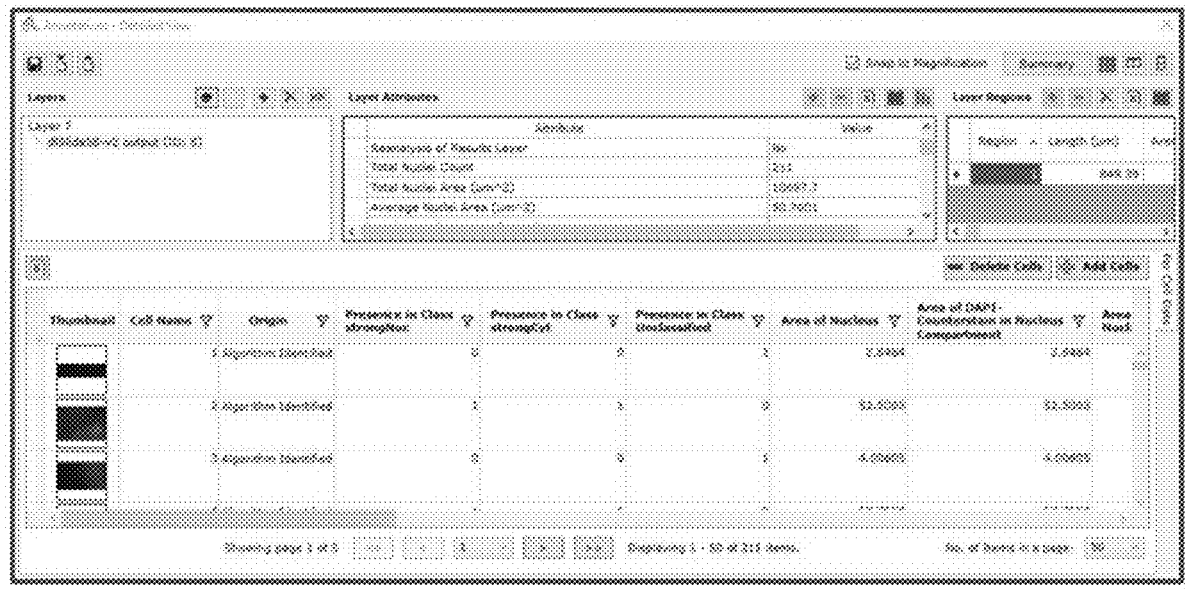
FIGS. 10A to 10I show a sequence of data panes during the same example editing session as shown in FIGS. 9A to 9I.

Based on the review of image and data panes of FIGS. 9A & 9B perhaps with some toggling of the image pane to compare the tissue image (see FIG. 1A) with the mark-up overlay image, the user decides the segmentation is not good enough, and so wants to embark on an editing session to modify the segmentation.

Figure 9C:
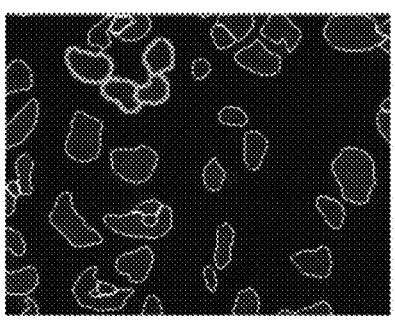
Figure 9D:
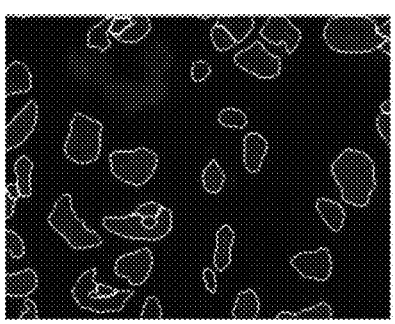
Figure 9E:
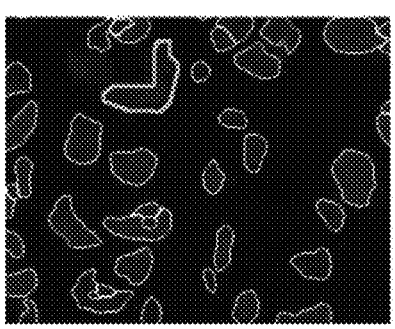
Figure 10B:
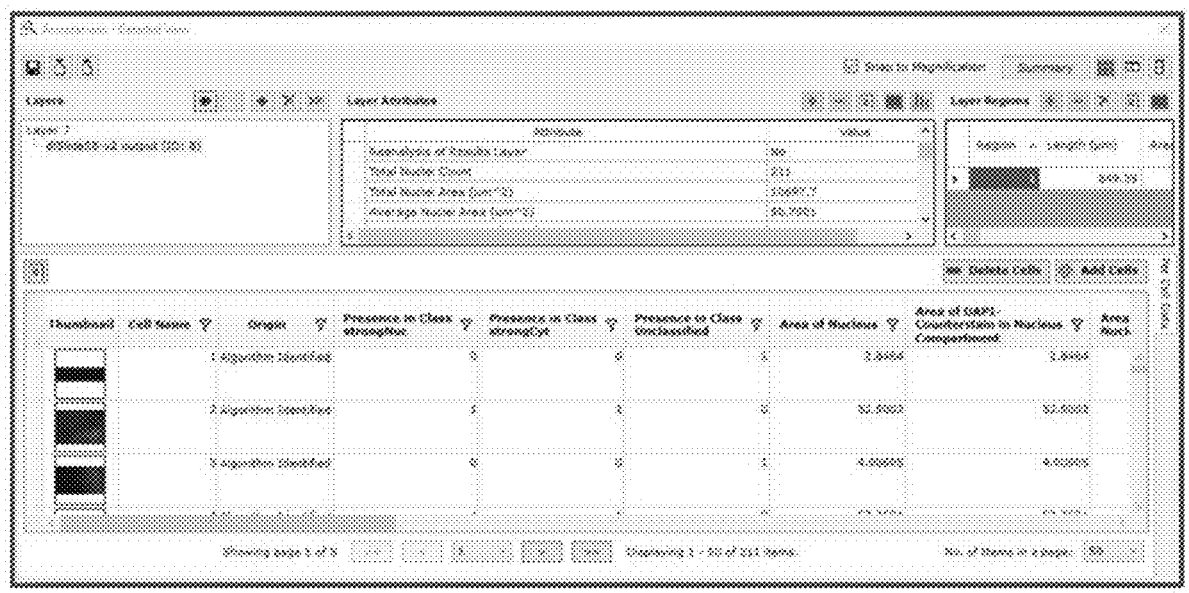

FIGS. 9B & 10B show the image and data panes where the user has initiated an editing session by entering a "delete cells mode". To facilitate deletion, the user has adjusted settings for the image pane to deactivate all but the DAPI nuclear counterstain channel image. For example, spectrum orange and spectrum green probe channels in the image data may have been deactivated. The tissue image is thus no longer a composite of all the channel images fused together, but rather only shows one channel in which the nuclei are strongly visible. The visibility of the nuclei in the DAPI image can be further enhanced by adjusting other image controls for contrast, brightness, colour map etc. FIGS. 9C, 9D and 9E also have the same nuclear channel settings.

Figure 10C:
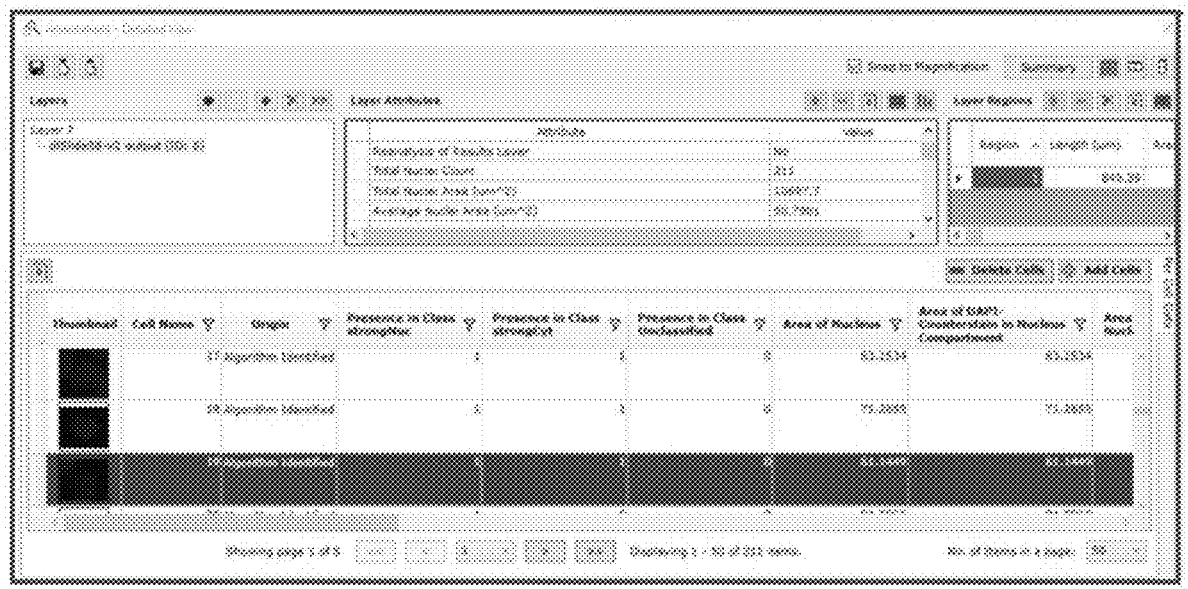

FIGS. 9C & 10C show the situation still in the "delete cells" mode, in which the user has via the image pane using a suitable GUI control selected four neighbouring cells for deletion. This statement is not in fact technically correct, since actually the user has selected the nuclear segmentation data for these four cells (not the cell representations in the tissue image). In other words, the user has selected these cells for deletion from their segmentation data, specifically here their nuclear segmentation data. The selected cells are highlighted in the image by using a different colouring or other visual marker for the nuclear segmentation data of these cells, as can be seen in FIG. 9C. Referring to FIG. 10C, it can also be seen that responsive to the selection of these four cells via the image pane the data pane has been updated to show the selection by highlighting the relevant four rows (only one being visible in the figure), e.g. by shading the row green. A cell can be selected in the image pane by, for example, clicking on the cell with a pointing device such as a mouse or trackball or by dragging a box around an area to select the one or more cells within the box. The box may be rectangular, circular or any other shape, and its shape may be user definable. As an alternative to selecting cells via the image pane, they may instead be selected from the data pane by selecting the row for that cell in the table. Selecting a cell via a table row will result in highlighting the relevant row, and also highlighting this cell in the image pane in the same way as if it had been selected via the image pane. Cell selection via the data pane may be facilitated through sorting the rows by column. For example, clicking on the head of the "area of nucleus" column will sort the rows so that the cells are listed in order of area (ascending or descending). The user is thus able to block select all cells above or below a certain area. In this way, the display of rows in the table can be ordered by a value of any desired cell attribute.

Figure 10D:
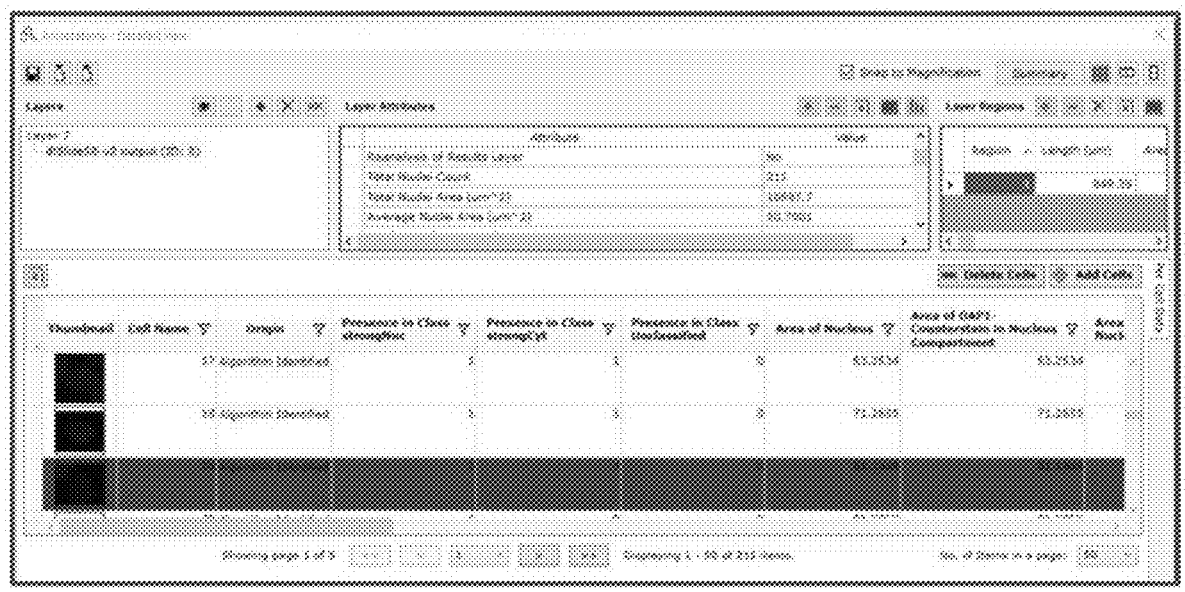

FIGS. 9D & 10D shows the situation after the user has deleted the cells marked for deletion in FIGS. 9C & 10C. These cells are not actually deleted at this point, rather only the segmentation data for these cells is now not displayed in the image pane (see FIG. 9D) and the rows for the deleted cells are now highlighted differently, e.g. shaded red instead of green. In other words, the act of deletion does not affect the underlying data, but only what is presented to the user in the display.

Figure 10E:
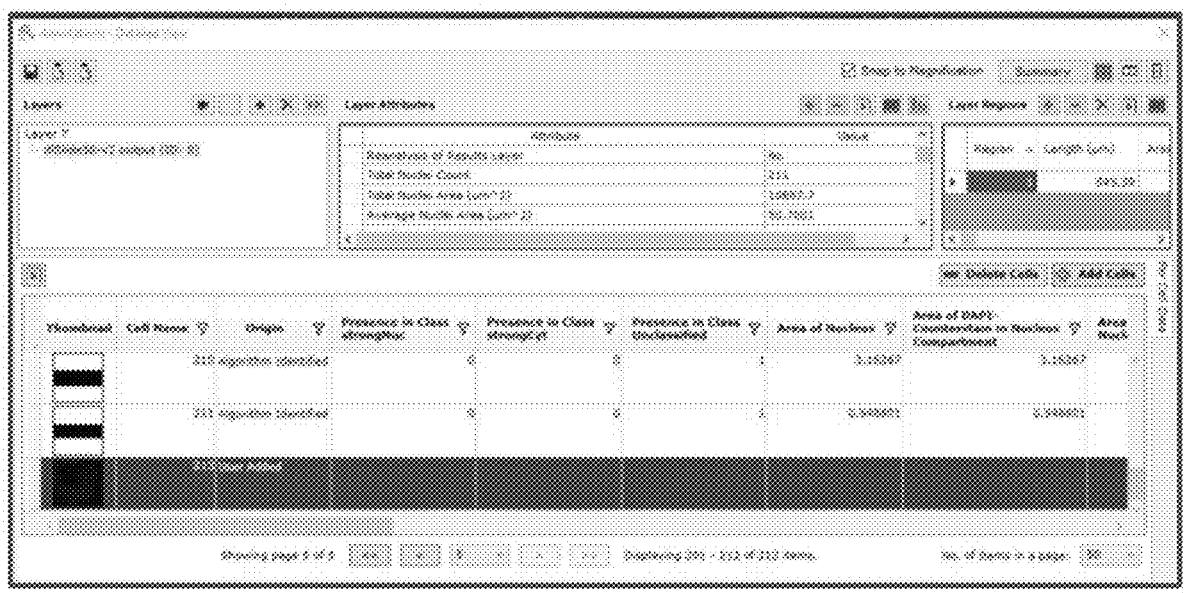

FIGS. 9E & 10E show the situation where the user is still in the editing session but has switched from "delete cells mode" to "add cells mode" in order to receive user input in the image pane to identify cells for addition to the segmentation data. For this, the user uses a drawing tool to draw an outline around one or more areas which the user perceives to correspond to nuclei. In the illustrated example, the user has drawn a single outline—to represent a single nucleus—around an area of nuclear material which was determined in the original segmentation to represent three nuclei (see FIGS. 9A, 9B & 9C). It can also be seen from FIG. 10E that responsive to identifying a cell for addition with the drawing tool, the data pane has been updated by adding a row for the new cell in the table, this new cell being labelled in the origin column as "user added" and highlighted, e.g. shaded green.

At this point in our example, the user decides to make these deletions and additions take effect and fetch a fresh set of per cell results and general results. The reanalysis is based on a re-segmentation and is initiated by the user activating a GUI button with an appropriate label such as "Analyse Annotations".

Figure 9F:
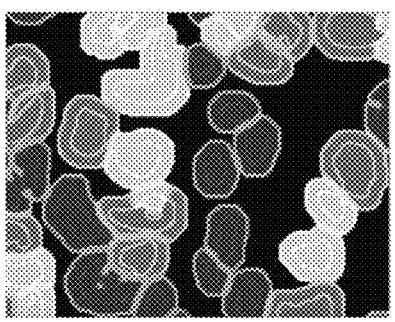
Figure 9G:
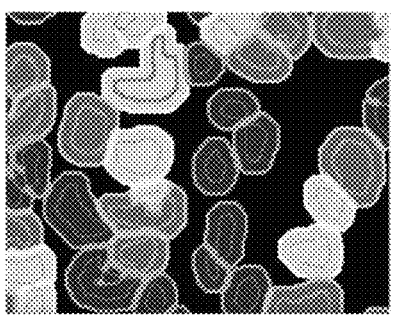
Figure 10F:
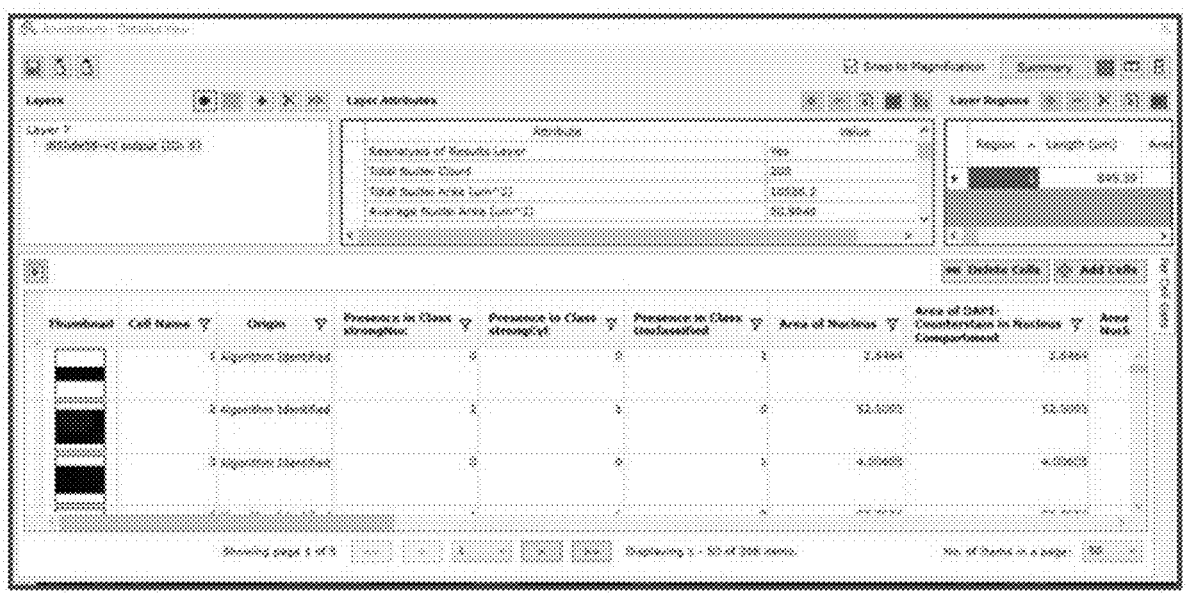
Figure 10G:
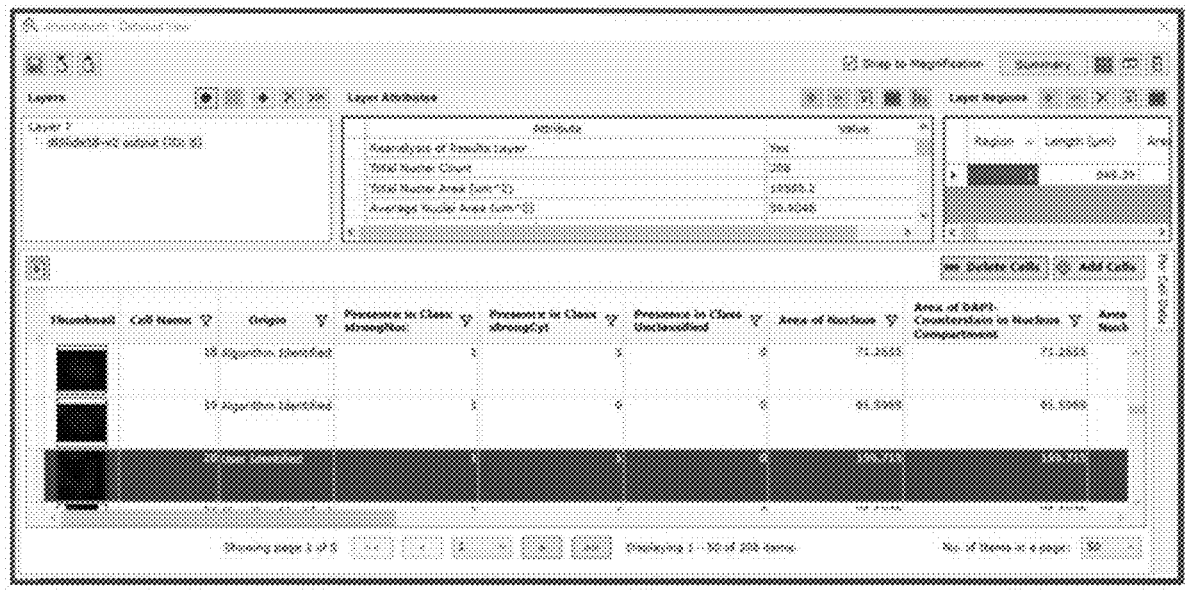

FIGS. 9F & 10F show the outcome of the reanalysis. As for the initial segmentation shown in FIGS. 9A & 10A the image pane that is first displayed is of a mark-up overlay image. Referring to the general data table in the data pane, it can be seen that the total number of nuclei is now 208, i.e. three fewer, consistent with the final state of the editing session prior to reanalysis. Referring to FIG. 5, the re-segmentation has taken the nuclear segmentation data from the end of the editing session and then performed Steps S10.2 & S10.3 to regrow the cytoplasm and cell membrane. In particular, we see the added cell is visible in FIG. 9F with its regrown cytoplasm and cell membrane FIGS. 9G & 10G show how after the reanalysis the user wants to review the re-segmentation for the added cell. This is done by selecting the added cell, which can be done in a convenient way by re-entering the "delete cell mode" (even though there is no prior intention to delete the added cell at this point) while staying in the mark-up overlay image. The selected cell is highlighted, e.g. by shading its row green. The added cell can be conveniently selected from the data pane by sorting one the origin column to find the "user identified" cells, or from the image pane by selection as before—assuming the user can recognize the added cell.

Figure 9H:
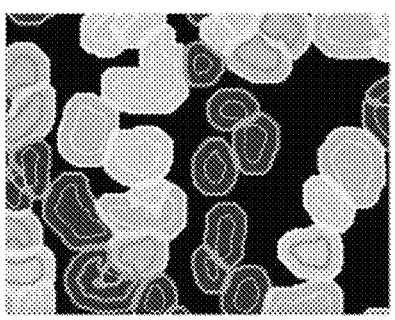
Figure 10H:
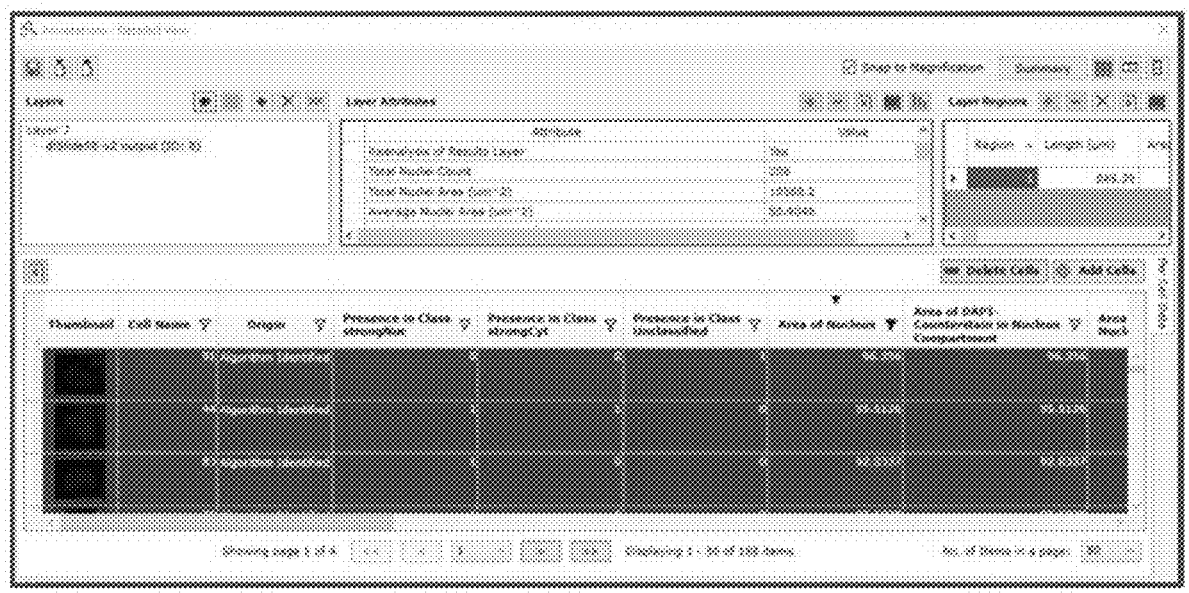

FIGS. 9H & 10H show a further progression. The user now block-marks several cells for deletion using the table sorting function (nine cells are selected for deletion in FIG. 9H). This particular example has selected all cells with a nuclear area below a certain value. With reference to FIG. 10H, it can be seen how this block selection was facilitated by a prior ascending sort on the "area of nucleus" column. The block selected cells are highlighted, e.g. by shading their rows green. The small nuclear area cells selected for deletion have their rows highlighted in the table, and their nuclear outlines highlighted in the image pane.

Figure 9I:
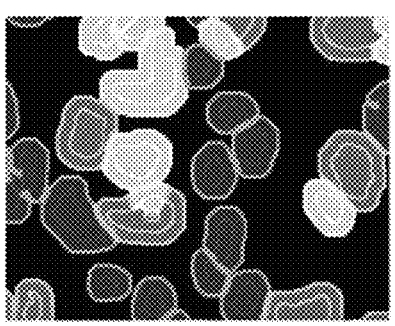
Figure 10I:
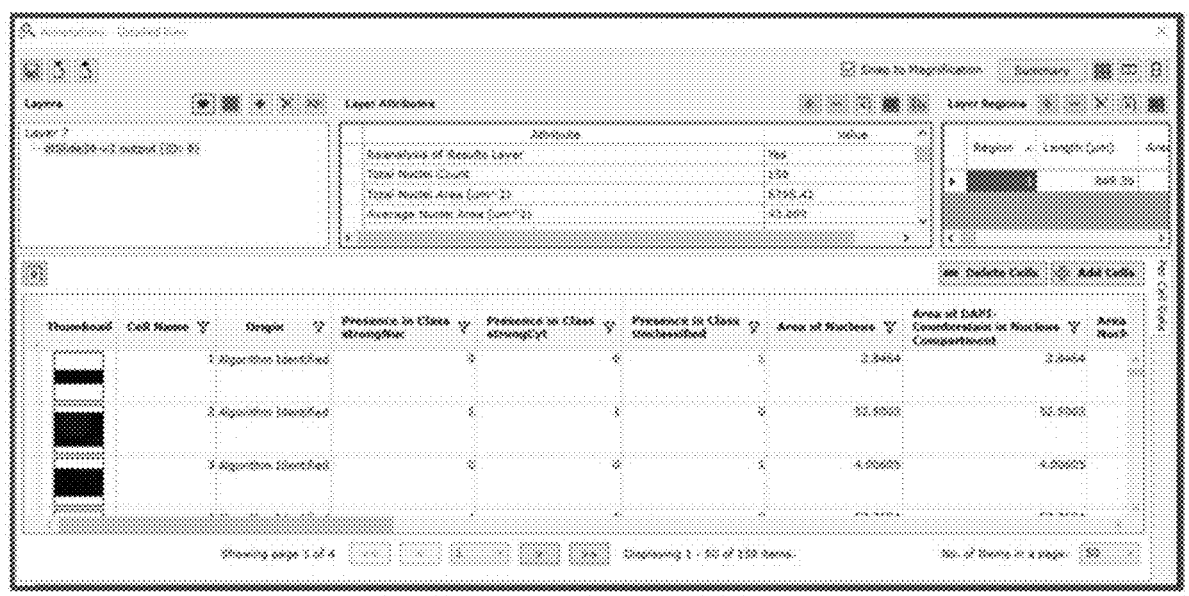

FIGS. 9I & 10I show the next stage after the cells selected for deletion in FIGS. 9H & 10H were deleted (in the sense of FIGS. 9D & 10D) and also after a reanalysis to redo the segmentation. As visible in FIG. 9I, the cells selected for deletion in FIGS. 9H & 10H are now absent following the re-segmentation. In addition, it can be seen that by removing certain cells from the segmentation, the geometric properties and also classification of some of the remaining cells has changed. It can also be seen from the generic data table in FIG. 10I that the number of nuclei has reduced from 208 to 158, i.e. the mass deletion was of 50 cells, not just the 9 visible in FIG. 9H. This is just because the images of FIGS. 9A to 9I do not include the full area covered by the analysis, so they could be magnified sufficiently to see the individual cells.

Figure 9J:
FIG. 9J shows an image of the underlying image data being analysed.

FIG. 9J is included for completeness. It is a reproduction of FIG. 1A showing a tissue image of the image data on which the example is based, the tissue image being a fusion of all probe channels contained in the underlying image data.

Microscope Platform

Figure 11:
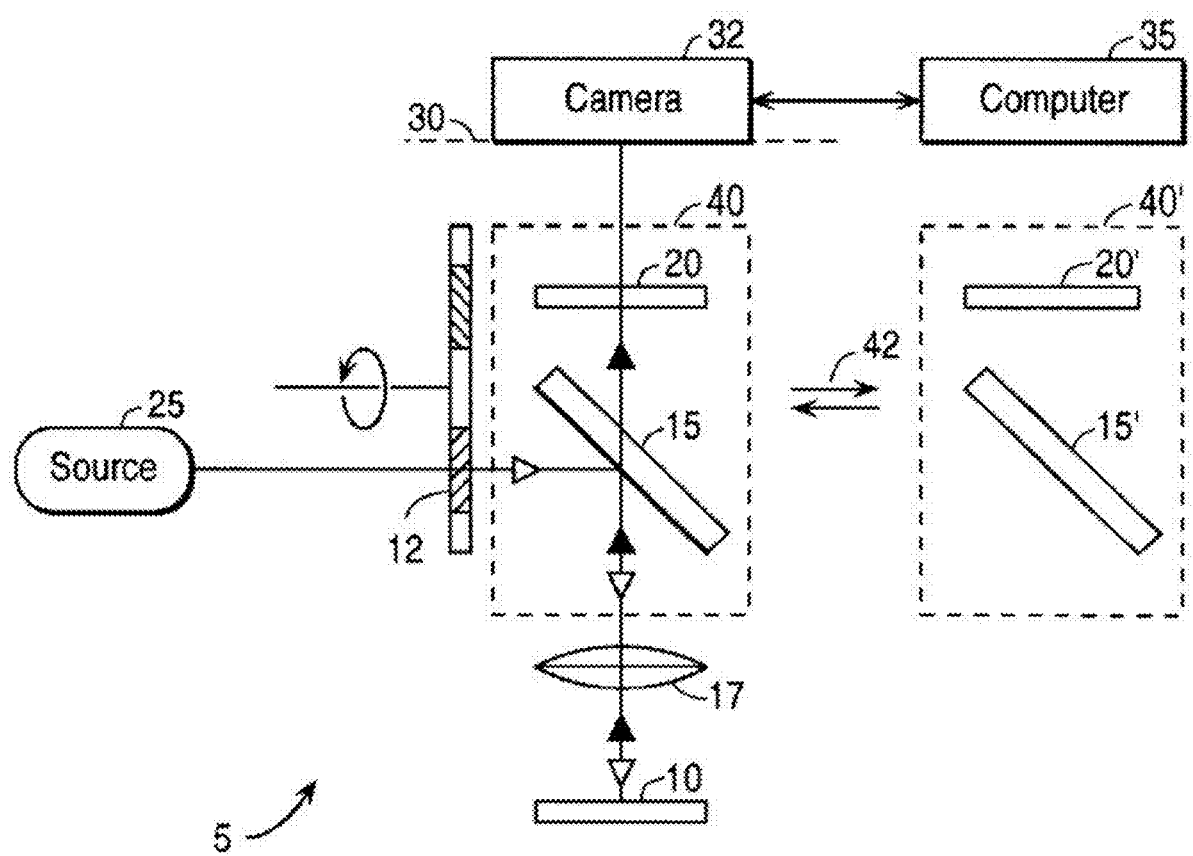
FIG. 11 is a schematic drawing of an example microscope system that is suitable for acquiring 2D pathology images of a tissue sample.

FIG. 11 is a schematic drawing of an example reflection-mode (i.e. epi) fluorescence microscope system 5, which is an example image acquisition apparatus suitable for acquiring 2D pathology images of a tissue section sample 10. The images may be fluorescently stained, e.g. FISH images, or images of samples stained with non-fluorescent stains, or images of unstained samples. The optical arrangement in the microscope system 5 includes an excitation filter 12 (shown as one of several such filters on a filter wheel), a dichroic mirror 15, a microscope objective 17 (say 60× to 100× image capture magnification), and an emission filter 20 (sometimes also referred to as a barrier filter). Excitation light from a source 25 passes through the excitation filter 12, is in part reflected by the dichroic mirror 15 and proceeds through the microscope objective 17 to the sample 10. The excitation light traveling towards the sample is shown schematically by hollow arrowheads. Fluorescent radiation emitted from the sample 10 passes back through the objective 17, through the dichroic mirror 15, and through the emission filter 20 to form an image in an image plane 30. The fluorescent light traveling away from the sample is shown schematically by solid black arrowheads. The image is digitized by a charge-coupled device (CCD) camera 32 and the digitized image is sent to a computer 35 for subsequent processing.

If the filters have single passbands, the particular filters and dichroic mirror are specific to a single dye in the sample. Images for other dyes in the sample are acquired by substituting optical elements configured for the excitation and emission bands for each other dye. The dichroic mirror and the emission filter are typically rigidly mounted to a supporting structure 40 (shown in phantom), often referred to as a cube, with multiple cubes being movable into and out of the optical path. Oppositely directed arrows 42 represent a suitable mechanism such as a rotatable turret or a detented slide mechanism. The multiple excitation filters are typically deployed on a rotatable filter wheel (as shown). The system may be for monochrome image acquisition or colour image acquisition. For colour acquisition the CCD camera is a colour CCD camera, multiband excitation is provided in three colour bands with respective sources, or a broadband source and appropriate filters, and three corresponding emission filters are provided that only transmit within one of three emission bands. Example dyes that are used for FISH include: DAPI, FITC (fluorescein isothiocyanate) and cyanine dyes such as Cy3, Cy3.5, Cy5, Cy5.5, and Cy7.

Computer 35 may be loaded with various sets of machine readable instructions, such as embodied in software, firmware, hardware of combinations thereof, in particular: to control the microscope arrangement to acquire images; to process the acquired images individually or collectively in sets of images to segment the image data and thereby generate segmentation data identifying objects of interest in the images; and to allow users to edit the segmentation data through manual intervention via a graphical user interface as described above.

Computing Platforms and Network Environment

The proposed image processing and GUI design may be carried out on a variety of computing architectures, in particular ones that are optimized for image processing, which may be based on central processing units (CPUs), GPUs, field-programmable gate arrays (FPGAs) and/or application-specific integrated circuits (ASICs). In some embodiments, the image processing software runs on Nvidia GPUs from Nvidia Corporation, Santa Clara, Calif., such as the Tesla K80 GPU. In other embodiments, the image processing software can run on generic CPUs. Faster processing may be obtainable by a purpose-designed processor for performing image processing calculations.

It will be understood that the computing power used for running the image processing software, whether it be based on CPUs, GPUs or some other processor type, may be hosted locally in a clinical network, e.g. the one described below, or remotely in a data centre.

The proposed computer-automated method operates in the context of a laboratory information system (LIS) which in turn is typically part of a larger clinical network environment, such as a hospital information system (HIS) or picture archiving and communication system (PACS). In the LIS, the image data files will be retained in a database, typically a patient information database containing the electronic medical records of individual patients. The image data files will be taken from stained tissue samples mounted on slides, the slides bearing printed barcode labels by which the image data files are tagged with suitable metadata, since the microscopes acquiring the image data files are equipped with barcode readers. From a hardware perspective, the LIS will be a conventional computer network, such as a local area network (LAN) with wired and wireless connections as desired.

Figure 12:
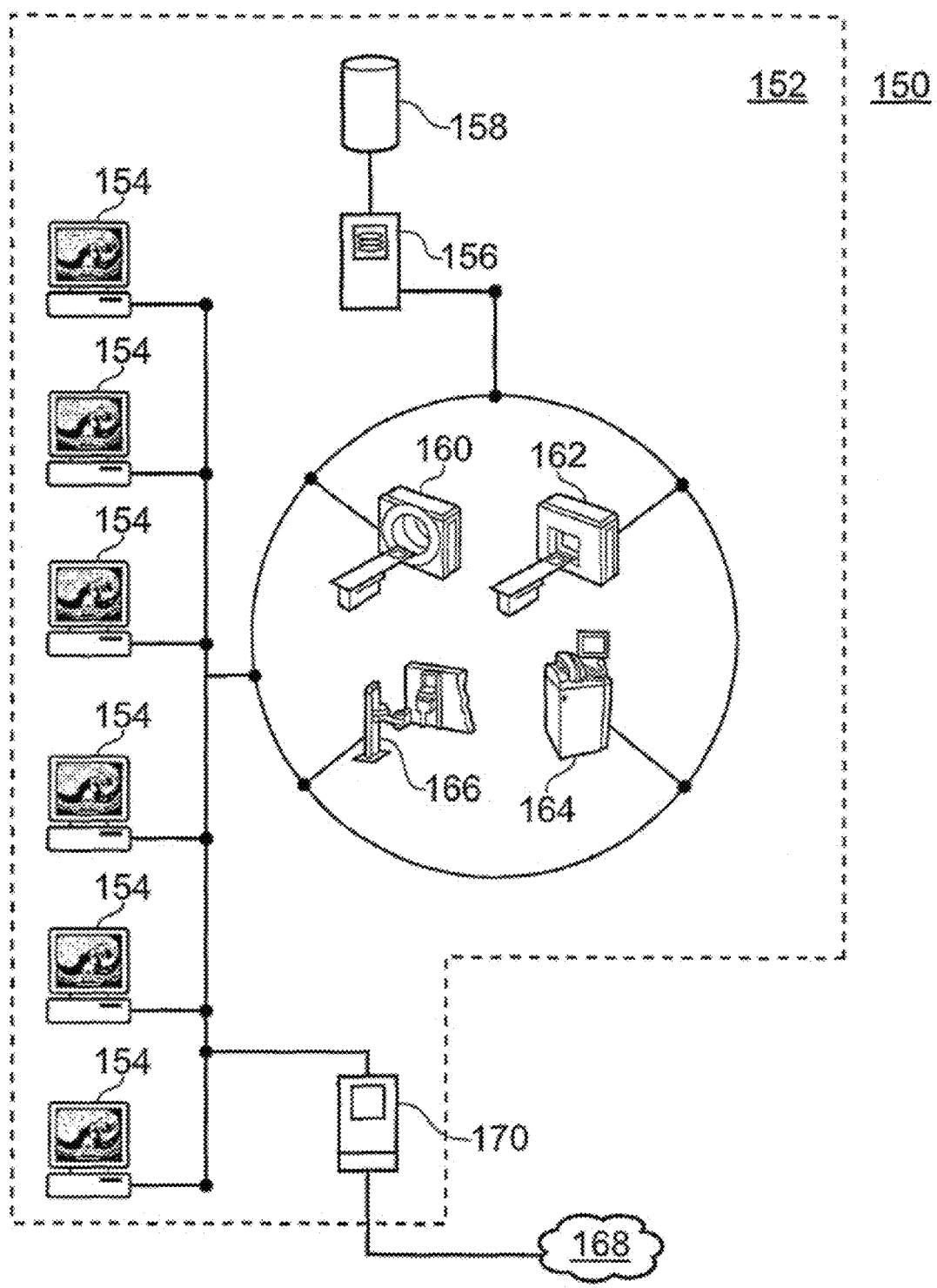
FIG. 12 shows an example computer network which can be used in conjunction with embodiments of the disclosure.

FIG. 12 shows an example computer network which can be used in conjunction with embodiments. The network 150 comprises a LAN in a hospital 152, i.e. is an example of a clinical network. The hospital 152 is equipped with a number of computer workstations 154 which each have access, via the local area network, to a hospital computer server 156 having an associated storage device 158. A LIS, HIS or PACS archive is stored on the storage device 158 so that data in the archive can be accessed from any of the workstations 154. The archive is a data repository configured to store records, the records including image data of 2D images of tissue section samples and segmentation data of objects of interest. The connections of the network enable transfer of the records, or parts thereof, between individual ones of the workstations 154 and the archive. One or more of the workstations 154 has access to a graphics card and to software for computer-implementation of methods of generating images as described hereinbefore. The software may be stored locally at the or each workstation 154 or may be stored remotely and downloaded over the network 150 to a workstation 154 when needed. In other example, methods may be executed on the computer server with the workstations 154 operating as terminals. For example, the workstations may be configured to receive user input defining a desired image data set and to display resulting images while image processing analysis is performed elsewhere in the system. Also, a number of 2D pathology image acquisition devices and other medical imaging devices 160, 162, 164, 166 are connected to the hospital computer server 156. Image data collected with the devices 160, 162, 164, 166 can be stored directly into the LIS, HIS or PACS archive on the storage device 156. Pathology images can then be viewed and processed immediately after the corresponding 2D image data are recorded. The local area network is connected to the Internet 168 by a hospital Internet server 170, which allows remote access to the LIS, HIS or PACS archive. This is of use for remote accessing of the data and for transferring data between hospitals, for example, if a patient is moved, or to allow external research to be undertaken.

Figure 13:
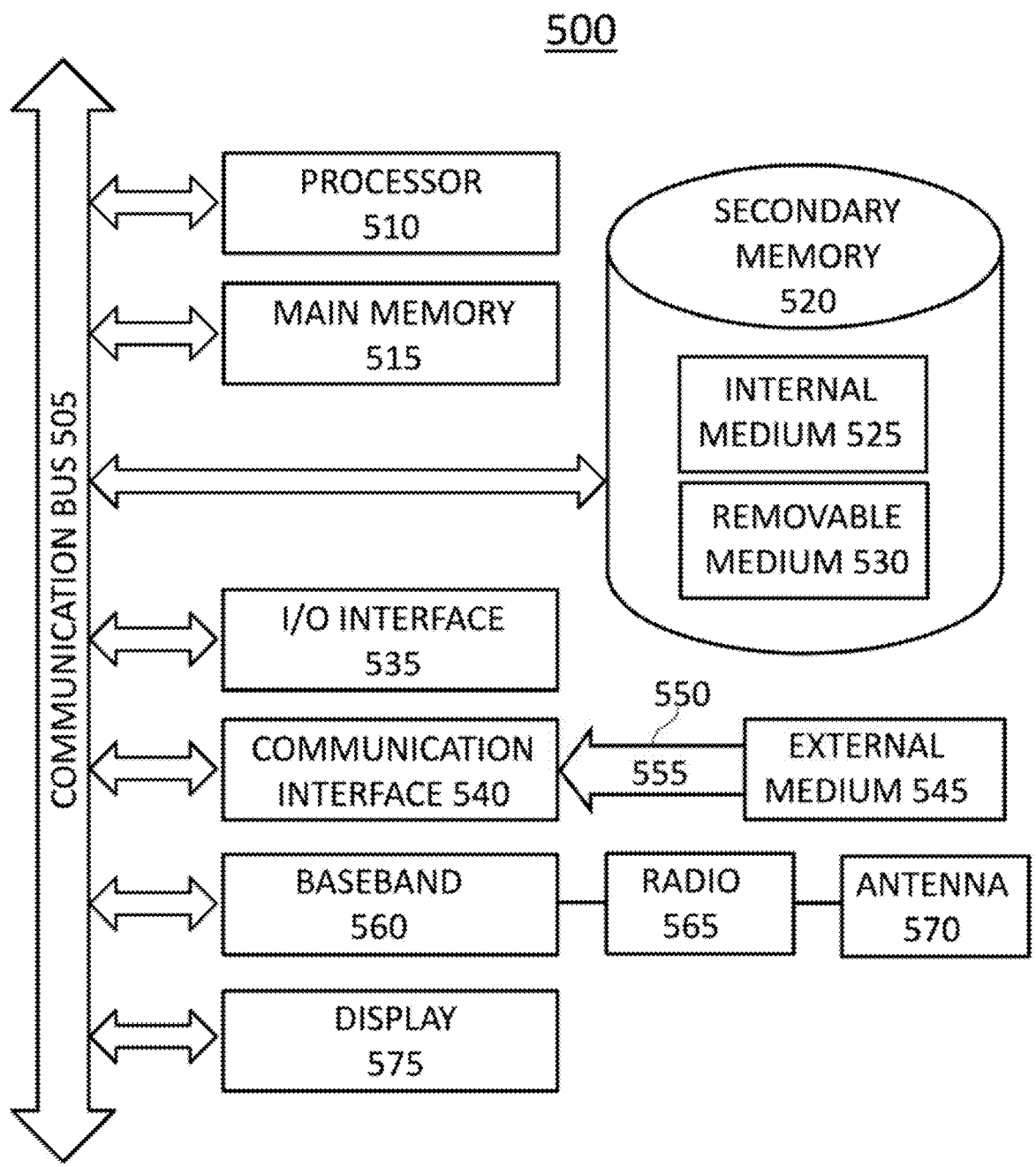
FIG. 13 is a block diagram of a computing apparatus that may be used for carrying out the image processing needed to implement embodiments of the disclosure.

FIG. 13 is a block diagram illustrating an example computing apparatus 500 that may be used in connection with various embodiments described herein. For example, computing apparatus 500 may be used as a computing node in the above-mentioned LIS or PACS system, for example a host computer from which processing of 2D pathology images is carried out in conjunction with a suitable CPU or GPU.

Computing apparatus 500 can be a server or any conventional personal computer, or any other processor-enabled device that is capable of wired or wireless data communication. Other computing apparatus, systems and/or architectures may be also used, including devices that are not capable of wired or wireless data communication, as will be clear to those skilled in the art.

Computing apparatus 500 preferably includes one or more processors, such as processor 510. The processor 510 may be for example a CPU or GPU or arrays or combinations thereof such as CPU and GPU combinations. Additional processors may be provided, such as an auxiliary processor to manage input/output, an auxiliary processor to perform floating point mathematical operations such as a tensor processing unit (TPU), a special-purpose microprocessor having an architecture suitable for fast execution of signal processing algorithms (e.g., digital signal processor, image processor), a slave processor subordinate to the main processing system (e.g., back-end processor), an additional microprocessor or controller for dual or multiple processor systems, or a coprocessor. Such auxiliary processors may be discrete processors or may be integrated with the processor 510. Examples of CPUs which may be used with computing apparatus 500 are, the Pentium processor, Core i7 processor, and Xeon processor, all of which are available from Intel Corporation of Santa Clara, Calif. An example GPU which may be used with computing apparatus 500 is Tesla K80 GPU of Nvidia Corporation, Santa Clara, Calif.

Processor 510 is connected to a communication bus 505. Communication bus 505 may include a data channel for facilitating information transfer between storage and other peripheral components of computing apparatus 500. Communication bus 505 further may provide a set of signals used for communication with processor 510, including a data bus, address bus, and control bus (not shown). Communication bus 505 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, or standards promulgated by the Institute of Electrical and Electronics Engineers (IEEE) including IEEE 488 general-purpose interface bus (GPM), IEEE 696/S-100, and the like.

Computing apparatus 500 preferably includes a main memory 515 and may also include a secondary memory 520. Main memory 515 provides storage of instructions and data for programs executing on processor 510, such as one or more of the functions and/or modules discussed above. It should be understood that computer readable program instructions stored in the memory and executed by processor 510 may be assembler instructions, instruction-set-architecture (ISA) instructions, machine instructions, machine dependent instructions, microcode, firmware instructions, state-setting data, configuration data for integrated circuitry, or either source code or object code written in and/or compiled from any combination of one or more programming languages, including without limitation Smalltalk, C/C++, Java, JavaScript, Perl, Visual Basic, .NET, and the like. Main memory 515 is typically semiconductor-based memory such as dynamic random-access memory (DRAM) and/or static random-access memory (SRAM). Other semiconductor-based memory types include, for example, synchronous dynamic random-access memory (SDRAM), Rambus dynamic random-access memory (RDRAM), ferroelectric random-access memory (FRAM), and the like, including read only memory (ROM).

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Secondary memory 520 may optionally include an internal memory 525 and/or a removable medium 530. Removable medium 530 is read from and/or written to in any well-known manner. Removable storage medium 530 may be, for example, a magnetic tape drive, a compact disc (CD) drive, a digital versatile disc (DVD) drive, other optical drive, a flash memory drive, etc.

Removable storage medium 530 is a non-transitory computer-readable medium having stored thereon computer-executable code (i.e., software) and/or data. The computer software or data stored on removable storage medium 530 is read into computing apparatus 500 for execution by processor 510.

The secondary memory 520 may include other similar elements for allowing computer programs or other data or instructions to be loaded into computing apparatus 500.

Such means may include, for example, an external storage medium 545 and a communication interface 540, which allows software and data to be transferred from external storage medium 545 to computing apparatus 500. Examples of external storage medium 545 may include an external hard disk drive, an external optical drive, an external magneto-optical drive, etc. Other examples of secondary memory 520 may include semiconductor-based memory such as programmable read-only memory (PROM), erasable programmable read-only memory (EPROM), electrically erasable read-only memory (EEPROM), or flash memory (block-oriented memory similar to EEPROM).

As mentioned above, computing apparatus 500 may include a communication interface 540. Communication interface 540 allows software and data to be transferred between computing apparatus 500 and external devices (e.g. printers), networks, or other information sources. For example, computer software or executable code may be transferred to computing apparatus 500 from a network server via communication interface 540. Examples of communication interface 540 include a built-in network adapter, network interface card (NIC), Personal Computer Memory Card International Association (PCMCIA) network card, card bus network adapter, wireless network adapter, Universal Serial Bus (USB) network adapter, modem, a network interface card (NIC), a wireless data card, a communications port, an infrared interface, an IEEE 1394 fire-wire, or any other device capable of interfacing system 550 with a network or another computing device. Communication interface 540 preferably implements industry-promulgated protocol standards, such as Ethernet IEEE 802 standards, Fibre Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 540 are generally in the form of electrical communication signals 555. These signals 555 may be provided to communication interface 540 via a communication channel 550. In an embodiment, communication channel 550 may be a wired or wireless network, or any variety of other communication links. Communication channel 550 carries signals 555 and can be implemented using a variety of wired or wireless communication means including wire or cable, fibre optics, conventional phone line, cellular phone link, wireless data communication link, radio frequency ("RF") link, or infrared link, just to name a few.

Computer-executable code (i.e., computer programs or software) is stored in main memory 515 and/or the secondary memory 520. Computer programs can also be received via communication interface 540 and stored in main memory 515 and/or secondary memory 520. Such computer programs, when executed, enable computing apparatus 500 to perform the various functions of the disclosed embodiments as described elsewhere herein.

In this document, the term "computer-readable medium" is used to refer to any non-transitory computer-readable storage media used to provide computer-executable code (e.g., software and computer programs) to computing apparatus 500. Examples of such media include main memory 515, secondary memory 520 (including internal memory 525, removable medium 530, and external storage medium 545), and any peripheral device communicatively coupled with communication interface 540 (including a network information server or other network device). These non-transitory computer-readable media are means for providing executable code, programming instructions, and software to computing apparatus 500. [90] In an embodiment that is implemented using software, the software may be stored on a computer-readable medium and loaded into computing apparatus 500 by way of removable medium 530, I/O interface 535, or communication interface 540. In such an embodiment, the software is loaded into computing apparatus 500 in the form of electrical communication signals 555. The software, when executed by processor 510, preferably causes processor 510 to perform the features and functions described elsewhere herein.

I/O interface 535 provides an interface between one or more components of computing apparatus 500 and one or more input and/or output devices. Example input devices include, without limitation, keyboards, touch screens or other touch-sensitive devices, biometric sensing devices, computer mice, trackballs, pen-based pointing devices, and the like. Examples of output devices include, without limitation, cathode ray tubes (CRTs), plasma displays, light-emitting diode (LED) displays, liquid crystal displays (LCDs), printers, vacuum florescent displays (VFDs), surface-conduction electron-emitter displays (SEDs), field emission displays (FEDs), and the like.

Computing apparatus 500 also includes optional wireless communication components that facilitate wireless communication over a voice network and/or a data network. The wireless communication components comprise an antenna system 570, a radio system 565, and a baseband system 560. In computing apparatus 500, radio frequency (RF) signals are transmitted and received over the air by antenna system 570 under the management of radio system 565.

Antenna system 570 may comprise one or more antennae and one or more multiplexors (not shown) that perform a switching function to provide antenna system 570 with transmit and receive signal paths. In the receive path, received RF signals can be coupled from a multiplexor to a low noise amplifier (not shown) that amplifies the received RF signal and sends the amplified signal to radio system 565.

Radio system 565 may comprise one or more radios that are configured to communicate over various frequencies. In an embodiment, radio system 565 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 565 to baseband system 560.

If the received signal contains audio information, then baseband system 560 decodes the signal and converts it to an analogue signal. Then the signal is amplified and sent to a speaker. Baseband system 560 also receives analogue audio signals from a microphone. These analogue audio signals are converted to digital signals and encoded by baseband system 560. Baseband system 560 also codes the digital signals for transmission and generates a baseband transmit audio signal that is routed to the modulator portion of radio system 565. The modulator mixes the baseband transmit audio signal with an RF carrier signal generating an RF transmit signal that is routed to antenna system 570 and may pass through a power amplifier (not shown). The power amplifier amplifies the RF transmit signal and routes it to antenna system 570 where the signal is switched to the antenna port for transmission.

Baseband system 560 is also communicatively coupled with processor 510, which may be a central processing unit (CPU). Processor 510 has access to data storage areas 515 and 520. Processor 510 is preferably configured to execute instructions (i.e., computer programs or software) that can be stored in main memory 515 or secondary memory 520. Computer programs can also be received from baseband processor 560 and stored in main memory 510 or in secondary memory 520 or executed upon receipt. Such computer programs, when executed, enable computing apparatus 500 to perform the various functions of the disclosed embodiments. For example, data storage areas 515 or 520 may include various software modules.

The computing apparatus further comprises a display 575 directly attached to the communication bus 505 which may be provided instead of or addition to any display connected to the I/O interface 535 referred to above. The display 575 or a display connected to the I/O interface 535 may be used for displaying the image data and segmentation data described above.

Various embodiments may also be implemented primarily in hardware using, for example, components such as application specific integrated circuits (ASICs), programmable logic arrays (PLA), or field programmable gate arrays (FPGAs). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope. In addition, the grouping of functions within a module, block, circuit, or step is for ease of description. Specific functions or steps can be moved from one module, block, or circuit to another without departing from the scope.

Moreover, the various illustrative logical blocks, modules, functions, and methods described in connection with the embodiments disclosed herein can be implemented or performed with a general purpose processor, a digital signal processor (DSP), an ASIC, FPGA, or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such that the processor can read information from, and write information to, the storage medium. In the alternative, the storage medium can be integral to the processor. The processor and the storage medium can also reside in an ASIC.

A computer readable storage medium, as referred to herein, is not to be construed as being transitory signals per se, such as radio waves or other freely propagating electromagnetic waves, electromagnetic waves propagating through a waveguide or other transmission media (e.g., light pulses passing through a fibre-optic cable), or electrical signals transmitted through a wire.

Any of the software components described herein may take a variety of forms. For example, a component may be a stand-alone software package, or it may be a software package incorporated as a "tool" in a larger software product. It may be downloadable from a network, for example, a website, as a stand-alone product or as an add-in package for installation in an existing software application. It may also be available as a client-server software application, as a web-enabled software application, and/or as a mobile application.

Embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

The computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The illustrated flowcharts and block diagrams illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the drawings. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be clear to one skilled in the art that many improvements and modifications can be made to the foregoing exemplary embodiment without departing from the scope of the present disclosure.

The invention claimed is:

1. An image processing apparatus comprising:
    a memory circuit storing computer-executable instructions; and
    at least one hardware processor configured to execute the computer-executable instructions, wherein execution of the computer-executable instructions causes the at least one hardware processor to:
        identify a plurality of cells of image data;
        generate segmentation data based on the plurality of cells;
        identify one or more cell attribute values for one or more cell attributes for each of the plurality of cells;
        cause display of:
            a representation comprising a tissue image of the image data or a segmentation image of the segmentation data, the representation identifying the plurality of cells, and
            a table of rows and columns, each row identifying a particular cell of the plurality of cells and each column identifying particular cell attribute values for a particular cell attribute of the one or more cell attributes values for the one or more cell attributes for each of the plurality of cells;
        provide graphical user interface tools comprising:
            a first cell feature removal tool, wherein the first cell feature removal tool enables marking one or more cells of the plurality of cells identified by the table for removal, and
            a second cell feature removal tool, wherein the second cell feature removal tool enables marking one or more cells of the plurality of cells identified by the representation;
        select a cell of the plurality of cells for removal from the segmentation data in response to a user interaction with the first cell feature removal tool or the second cell feature removal tool; and
        cause display of an updated representation and an updated table based on the cell selected for removal.

2. The image processing apparatus of claim 1, wherein:
    the segmentation data comprises nuclear segmentation data, cytoplasm segmentation data, and cell membrane segmentation data,
    the nuclear segmentation data comprises, for each cell in the plurality of cells, a corresponding nucleus for that cell;
    the execution of the computer-executable instructions further causes the at least one hardware processor to generate updated segmentation data based on:
        creating updated nuclear segmentation data based on removing the corresponding nucleus for the cell from the plurality of cells selected for removal from the nuclear segmentation data; and
        generating updated cytoplasm segmentation data and updated cell membrane segmentation data based on the updated nuclear segmentation data.

3. The image processing apparatus of claim 2, wherein, the execution of the computer-executable instructions further causes the at least one hardware processor to display an updated segmentation image of the updated segmentation data.

4. The image processing apparatus of claim 1, wherein the graphical user interface tools further comprise a cell feature adding tool that enables marking one or more cells of the plurality of cells identified by the representation for addition, wherein the execution of the computer-executable instructions further causes the at least one hardware processor to:
    define a cell for addition, based on a user interaction with the cell feature adding tool; and
    update the segmentation data based on defining the cell for addition.

5. The image processing apparatus of claim 4, wherein the cell selected for removal and the cell defined for addition are located in a particular area of the tissue image.

6. The image processing apparatus of claim 4, wherein the execution of the computer-executable instructions further causes the at least one hardware processor to update the representation responsive to defining the cell for addition.

7. The image processing apparatus of claim 1, wherein the execution of the computer-executable instructions further causes the at least one hardware processor to, subsequent to causing display of the updated representation and the updated table, perform a further editing session and a further display.

8. The image processing apparatus of claim 1, wherein causing display of the updated representation and the updated table is limited to a particular area of the tissue image where the cell for removal is located.

9. The image processing apparatus of claim 1, wherein the execution of the computer-executable instructions further causes the at least one hardware processor to provide an undo tool, wherein the undo tool enables the reversion of the segmentation data.

10. The image processing apparatus of claim 1, wherein the execution of the computer-executable instructions further causes the at least one hardware processor to segment the image data, wherein the segmentation data is based at least in part on segmenting the image data.

11. The image processing apparatus of claim 1, wherein the representation is a two-dimensional representation or a three-dimensional representation.

12. The image processing apparatus of claim 1, wherein the user interaction comprises a user interaction during an editing session, wherein:
    the cell is selected from the table, via the first cell feature removal tool, by marking the cell in the table, wherein in response to selecting the cell from the table, the representation is updated to identify the selection of the cell, or
    the cell is selected from the representation, via the second cell feature removal tool, by marking the cell in the representation, wherein in response to selecting the cell from the representation, the table is updated to identify the selection of the cell.

13. A method for processing image data representing cells, the method comprising:
   identifying a plurality of cells of image data;
   generating segmentation data based on the plurality of cells;
   identifying one or more cell attribute values for one or more cell attributes for each of the plurality of cells;
   causing display of:
      a representation comprising a tissue image of the image data or a segmentation image of the segmentation data, the representation identifying the plurality of cells, and
      a table of rows and columns, each row identifying a particular cell of the plurality of cells and each column identifying particular cell attribute values for a particular cell attribute of the one or more cell attributes values for the one or more cell attributes for each of the plurality of cells;
   providing graphical user interface tools comprising:
      a first cell feature removal tool, wherein the first cell feature removal tool enables marking one or more cells of the plurality of cells identified by the table for removal, and
      a second cell feature removal tool, wherein the second cell feature removal tool enables marking one or more cells of the plurality of cells identified by the representation;
   selecting a cell of the plurality of cells for removal from the segmentation data in response to a user interaction with the first cell feature removal tool or the second cell feature removal tool; and
   causing display of an updated representation and an updated table based on the cell selected for removal.

14. A non-transitory computer-readable medium having instructions stored thereon, wherein the instructions, when executed by at least one hardware processor of a system, cause the system to:
   identify a plurality of cells of image data;
   generate segmentation data based on the plurality of cells;
   identify one or more cell attribute values for one or more cell attributes for each of the plurality of cells;
   cause display of:
      a representation comprising a tissue image of the image data or a segmentation image of the segmentation data, the representation identifying the plurality of cells, and
      a table of rows and columns, each row identifying a particular cell of the plurality of cells and each column identifying particular cell attribute values for a particular cell attribute of the one or more cell attributes values for the one or more cell attributes for each of the plurality of cells;
   provide graphical user interface tools comprising:
      a first cell feature removal tool, wherein the first cell feature removal tool enables marking one or more cells of the plurality of cells identified by the table for removal, and
      a second cell feature removal tool, wherein the second cell feature removal tool enables marking one or more cells of the plurality of cells identified by the representation;
   select a cell of the plurality of cells for removal from the segmentation data in response to a user interaction with the first cell feature removal tool or the second cell feature removal tool; and
   cause display of an updated representation and an updated table based on the cell selected for removal.

15. The non-transitory computer-readable medium of claim 14, wherein the user interaction comprises a user interaction during an editing session, wherein:
   the cell is selected from the table, via the first cell feature removal tool, by marking the cell in the table, wherein in response to selecting the cell from the table, the representation is updated to identify the selection of the cell, or
   the cell is selected from the representation, via the second cell feature removal tool, by marking the cell in the representation, wherein in response to selecting the cell from the representation, the table is updated to identify the selection of the cell.

16. The non-transitory computer-readable medium of claim 14, wherein the instructions, when executed by the at least one hardware processor, further cause the system to segment the image data, wherein the segmentation data is based at least in part on segmenting the image data.

17. The non-transitory computer-readable medium of claim 14, wherein the representation is a two-dimensional representation or a three-dimensional representation.

18. The non-transitory computer-readable medium of claim 14, wherein causing display of the updated representation and the updated table is limited to a particular area of the tissue image where the cell for removal is located.

19. The non-transitory computer-readable medium of claim 14, wherein the image data comprises a plurality of channel images, each channel image associated with a different stain, wherein the tissue image is one of the plurality of channel images or a composite of at least two of the plurality of channel images fused together.

20. The non-transitory computer-readable medium of claim 14, wherein the graphical user interface tools further comprise a cell feature adding tool that enables marking one or more cells of the plurality of cells identified by the representation for addition, wherein the instructions, when executed by the at least one hardware processor, further cause the system to:
   define a cell for addition, based on a user interaction with the cell feature adding tool; and
   update the segmentation data based on defining the cell for addition.

* * * * *